US009173413B2

(12) United States Patent
Peters et al.

(10) Patent No.: US 9,173,413 B2
(45) Date of Patent: Nov. 3, 2015

(54) CARRIER FOR SUPPORTING A CARCASS PART OF SLAUGHTERED POULTRY

(71) Applicant: MAREL STORK POULTRY PROCESSING B.V., Boxmeer (NL)

(72) Inventors: Erik Hendrikus Werner Peters, Boxmeer (NL); Maurice Eduardus Theodorus Van Esbroeck, Bemmel (NL); Johannis Anthonie Vroegop, Nijmegen (NL)

(73) Assignee: MAREL STORK POULTRY PROCESSING B.V., Boxmeer (NL)

( * ) Notice: Subject to any disclaimer, the term of this patent is extended or adjusted under 35 U.S.C. 154(b) by 0 days.

(21) Appl. No.: 14/345,178

(22) PCT Filed: Sep. 21, 2012

(86) PCT No.: PCT/NL2012/050670
§ 371 (c)(1),
(2) Date: Mar. 14, 2014

(87) PCT Pub. No.: WO2013/048239
PCT Pub. Date: Apr. 4, 2013

(65) Prior Publication Data
US 2014/0357172 A1 Dec. 4, 2014

(30) Foreign Application Priority Data

Sep. 28, 2011 (NL) .................................... 2007492

(51) Int. Cl.
*A22C 21/00* (2006.01)

(52) U.S. Cl.
CPC ........... *A22C 21/0046* (2013.01); *A22C 21/003* (2013.01); *A22C 21/0023* (2013.01); *A22C 21/0053* (2013.01)

(58) Field of Classification Search
CPC ...... A22C 17/00; A22C 17/002; A22C 21/00; A22C 17/02; A22C 21/007; A22C 21/0023; A22C 21/003; A22C 21/0046; A22C 21/0053; A22C 21/0092

USPC ......... 452/135, 136, 149–153, 155, 156, 166, 452/167, 177, 185, 194–196, 165, 178, 179, 452/187
See application file for complete search history.

(56) References Cited

U.S. PATENT DOCUMENTS

| 4,656,692 A | 4/1987 | Villemin et al. |
| 5,474,491 A * | 12/1995 | Koch ............................ 452/165 |
| 5,697,837 A * | 12/1997 | Verrijp et al. ................. 452/170 |
| 6,837,782 B2 * | 1/2005 | Hetterscheid et al. ........ 452/179 |

(Continued)

FOREIGN PATENT DOCUMENTS

| EP | 0 254 332 A1 | 1/1988 |
| WO | WO 00/22933 A1 | 4/2000 |

*Primary Examiner* — Richard Price, Jr.
(74) *Attorney, Agent, or Firm* — Birch, Stewart, Kolasch & Birch, LLP

(57) ABSTRACT

A carrier for supporting a carcass part of slaughtered poultry includes a carrier body having a support surface for engaging at least a part of the inner face of the carcass part, a hook for holding the carcass part on the carrier body, a positioning element for positioning the carcass part relative to the carrier, which has a dome shaped engagement end for engaging the inner face of the carcass part, and is moveable between a retracted position and an extended position in which the dome shaped engagement end of the positioning element protrudes from the support surface of the carrier body. The positioning element is arranged such relative to the support surface of the carrier body that in its extended position, the dome shaped engagement end of the positioning element engages the inner face of the carcass part at or adjacent to the facies visceralis sterni of the sternum in the region between the left and right margo costalis of the sternum.

25 Claims, 28 Drawing Sheets

(56) References Cited

U.S. PATENT DOCUMENTS

| | | |
|---|---|---|
| 6,986,707 B2 * | 1/2006 | Van Den Nieuwelaar et al. ............ 452/187 |
| 8,192,258 B2 * | 6/2012 | Janssen et al. ............ 452/136 |
| 8,540,556 B2 * | 9/2013 | Hiddink et al. ............ 452/179 |
| 8,845,402 B2 * | 9/2014 | Janssen ............ 452/136 |
| 2010/0323599 A1 | 12/2010 | Hiddink et al. |

* cited by examiner

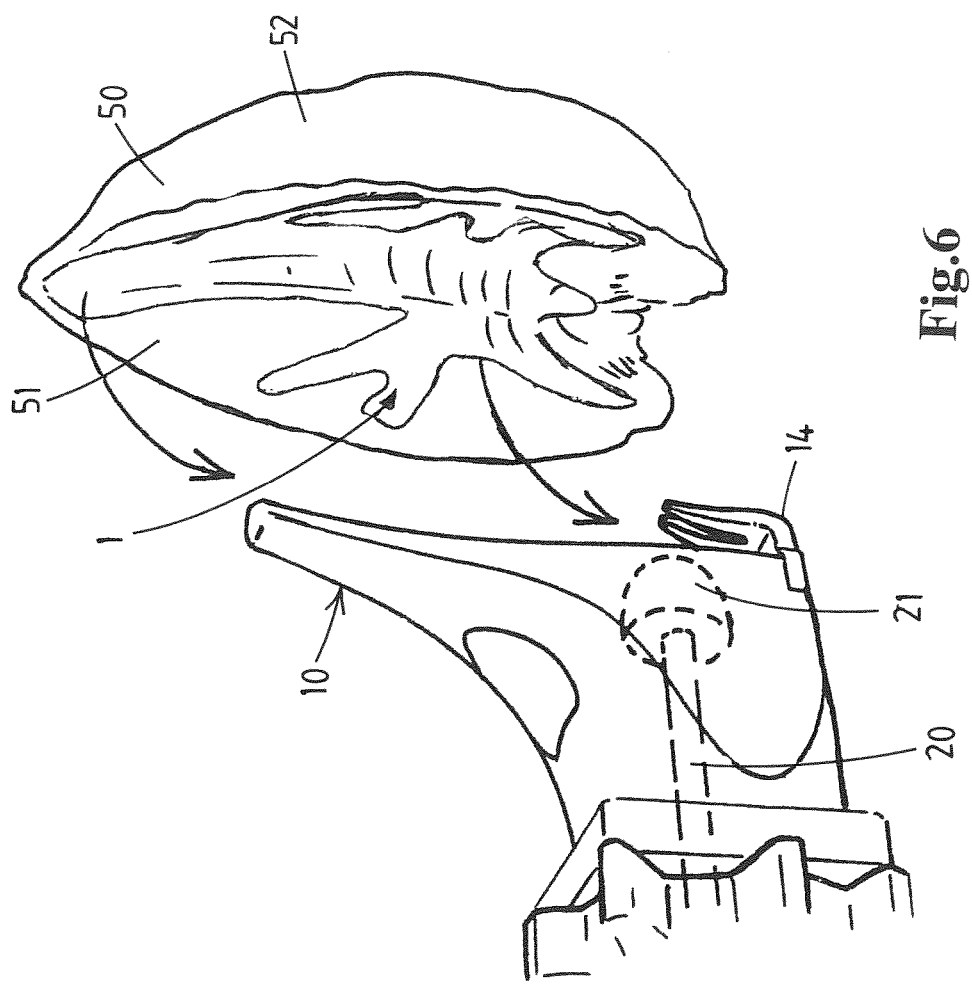

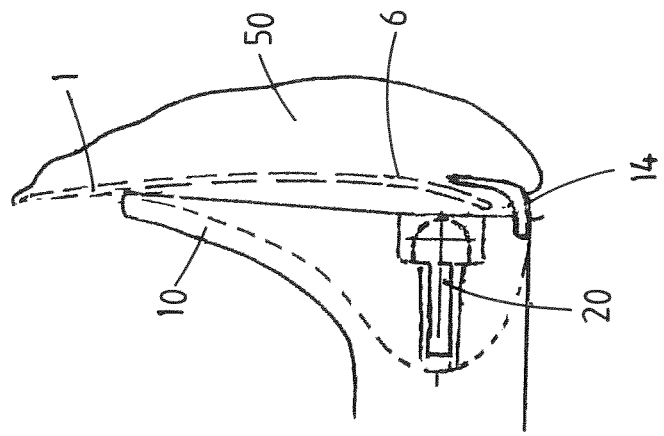
Fig.7b
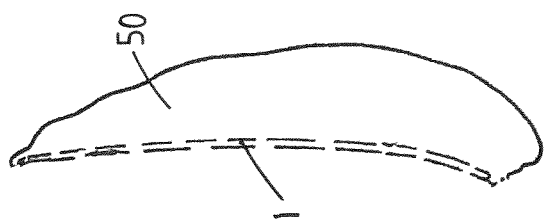
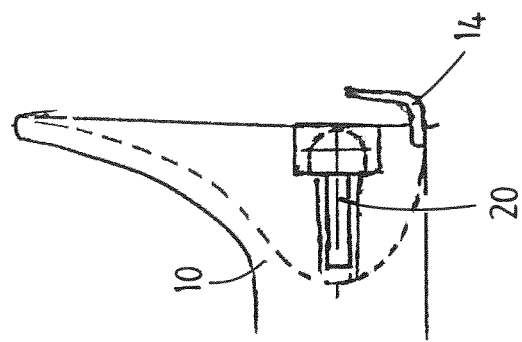
Fig.7a

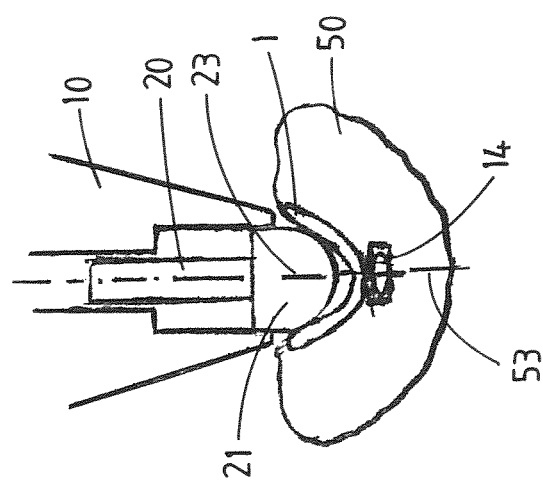

CARRIER FOR SUPPORTING A CARCASS PART OF SLAUGHTERED POULTRY

BACKGROUND OF THE INVENTION

1. Field of the Invention

The invention pertains to a carrier for supporting a carcass part of slaughtered poultry, a system for processing slaughtered poultry wherein such a carrier is used and a method for arranging a carcass part of slaughtered poultry onto a carrier.

2. Description of Background Art

In automated poultry processing plants, carcass parts of slaughtered poultry are arranged on dedicated carriers, each carrier supporting a carcass part during the processing and/or during transport form one processing station to the next.

It is known to use carriers that have a shape that is adapted to the shape of the carcass part to be carried by the carrier. For example, EP1123006 discloses such a carrier.

This known carrier engages the inside of the carcass part to be processed. The known carrier comprises a carrier body which has a shape that generally matches the shape of the inside of the carcass part. The corpus sterni of the sternum lies on this carrier body. The carrier further comprises a hook that engages the carcass part in the area of the wishbone once the carcass part is arranged on the carrier. The hook pushes the carcass part against the carrier body and holds it in place.

A problem related to this kind of carrier is that the carcass part has to be arranged quite accurately on the carrier body, in such a way that the corpus sterni indeed lies on the bump of the carrier body. This accurate positioning has to be done by the person or the device that places the carcass parts onto the carriers, but it often has to be done at high speed. Once the carcass part is placed onto the carrier, in either the right position relative to the carrier or not, the carcass part is clamped onto the carrier by the hook without further adjustments being made.

The object of the invention is to provide a carrier that is at least an alternative to known carriers.

This object is achieved by a carrier for supporting a carcass part of slaughtered poultry,
which carcass part comprises an inner face and an outer face,
which carcass part further comprises at least a part of the corpus sterni of the sternum, the corpus sterni comprising at least a part of the facies visceralis sterni, and at least a part of the facies muscularis sterni,
the inner face being on the same side of the sternum as the facies visceralis sterni and the outer face being on the same side of the sternum as the facies muscularis sterni,
the carrier comprising:
a carrier body, said carrier body comprising a support surface for engaging at least a part of the inner face of the carcass part,
a hook for holding the carcass part on the carrier body,
a positioning element for positioning the carcass part relative to the carrier, which positioning element has a dome shaped engagement end for engaging the inner face of the carcass part,
which positioning element is moveable between a retracted position and an extended position in which extended position the dome shaped engagement end of the positioning element protrudes from the support surface of the carrier body,
the positioning element being arranged such relative to the support surface of the carrier body that in its extended position, the dome shaped engagement end of the positioning element engages the inner face of the carcass part at or adjacent to the facies visceralis sterni of the sternum in the region between the left and right margo costalis of the sternum.

SUMMARY OF THE INVENTION

In the carrier according to the invention, the positioning of the carcass part relative the carrier is carried out by a positioning element that has a dome shaped engagement end. The positioning element is moveable between a retracted position and an extended position. In the extended position, the dome shaped engagement end of the positioning element protrudes at least partly from the surface of the carrier body.

The carrier according to the invention is adapted to support a carcass part that comprises an inner face and an outer face. The carcass part further comprises at least a part of the corpus sterni of the sternum, the corpus sterni comprising at least a part of the facies visceralis sterni, and at least a part of the facies muscularis sterni. The inner face of the carcass part is on the same side of the sternum as the facies visceralis sterni and the outer face of the carcass part is on the same side of the sternum as the facies muscularis sterni.

Examples of such carcass parts are front halves and breast caps.

The facies visceralis sterni is the bone surface of the corpus sterni on the side that in a living bird is facing the lungs and viscera (so the side which is opposite to the side of the sternum having the carina sterni (crest) on). The facies visceralis sterni has a curved shape in the region between the left and right margo costalis. This part of the facies visceralis sterni may form part of the inner face of the carcass part, but it could be that it is still at least partly covered by some tissue, or that tissue fragments are still present on its surface. However, in this particular region, the inner face of the carcass part will have substantially the same shape as the facies visceralis sterni. In the current invention, this particular shape is used to obtain a reliable and reproducible positioning of the carcass part relative to the carrier.

When the positioning element is moved from its retracted position to its extended position, its dome shaped engagement end presses against the inner face of the carcass part in the region between the left and right margo costalis. By pressing the dome shaped engagement end of the positioning element against this part of the inner surface of the carcass part, the carcass part will move relative to the carrier in such a way that the dome shaped engagement end of the positioning element will come to lie into the curved portion of the facies visceralis sterni in the region between the left and right margo costalis as deep as the shape and dimensions of the dome shaped engagement end allow. This way, the carcass part will center and/or straighten itself on the dome shaped engagement end of the positioning element.

The hook of the carrier prevents that the positioning element pushes the carcass part of the carrier when the positioning element moves towards its extended position.

In a possible embodiment, the hook and the positioning element hold the carcass part in place during transport and/or processing of that carcass part after the carcass part is positioned relative to the carrier by the positioning element. In this embodiment, optionally one or more auxiliary holding elements are provided to help the carcass part keep its position relative to the carrier. These holding elements could for example be pins with a sharp tip. They could be attached to the carrier body or be arranged in the positioning element and/or in the hook. Preferably, the holding elements have a retracted position and an extended position. In the retracted position, they do not hinder the movements of the carcass part relative to carrier during the process of positioning the carcass part relative to the carrier by means of the positioning element. In the extended position, they engage the carcass part (or even penetrate into the carcass part) to hold it in place.

The one or more holding elements preferably hold the carcass part in place relative to the carrier only after the carcass part is positioned relative to the carrier by the positioning element. The holding element or holding elements can do that by itself/themselves or can do that together with the hook of the carrier and/or the positioning element.

In a possible embodiment, the dome shaped engagement end of the positioning element is retracted from the carcass part once the carcass part is fixated relative to the carrier for example by the hook, by the holding elements or by a combination thereof. The retraction of the dome shaped engagement end can be effected by moving the positioning element from its extended position back towards its retracted position, either partly or fully.

When using the carrier according to the invention, generally the carcass part is initially arranged on the carrier body in such a way that it is already rather close to the right position and orientation relative to the carrier. This initial position and orientation does not have to be precise. The initial placement of the carcass part onto the carrier can be done manually by an operator, or automatically or semi-automatically. Generally, the carrier body, and in particular the support surface of the carrier body, will have a shape that is adapted for the shape of the inner face of the carcass part to be supported.

The carcass part will be put on the carrier in such a way that the inner face of the carcass part faces the support surface of the carrier body. This allows the positioning element to engage the carcass part on the correct side in order to cooperate with the inner face of the carcass part in the region of the facies visceralis sterni between the left and right margo costalis.

In a possible embodiment, when the carcass part is initially placed on the carrier, the inner face of the carcass part lies at least partly against the support surface of the carrier body. The hook can be free from the carcass part when the carcass part is put onto the carrier, and move into engagement with the carcass part after the initial placement of the carcass part on the carrier, e.g. by moving the hook towards the carcass part. Alternatively, the hook can be in engagement with the carcass part right from the start. The hook could engage the outside of the carcass part, for example on its outer face, or the hook may penetrate into the carcass part.

It is possible that the carcass part is initially arranged onto the hook without the inner face of the carcass part being in full contact, or even without being in contact at all, with the support surface of the carrier body. This could for example occur when the carcass part is skewered onto the hook as the initial arrangement on the carrier.

In embodiments in which the hook is to penetrate into the carcass part the hook may be provided with a cutting edge or one or more pointed tips. In a possible embodiment, the hook is provided with a slit to accommodate one or more tendons of the carcass part in the region of the sternum, e.g. tendons extending from the carina sterni (the crest of the sternum which extends from the corpus sterni).

The hook may be provided with a curved surface, to assist in the positioning of the carcass part onto the carrier. This curved surface preferably faces into the direction of the positioning element.

The initial engagement of the carcass part by the hook, whether it is from the outside of the carcass part of by penetration into the carcass part, is however not such that the carcass part's position relative to the carrier becomes fixated by the hook. Rather, the initial engagement of the hook with the carcass part is such that the hook still allows some movement of the carcass part relative to the carrier.

After the carcass part is placed on the carrier in its initial position and initial orientation and the hook is in engagement with the carcass part, the positioning element is brought into engagement with the inner face of the carcass part. The positioning element is then brought forward further until it reaches is extended position. The hook prevents that the carcass part falls off the carrier due to the movement of the positioning element, and it provides a reaction force to the force that the positioning element exerts on the carcass part. It is not necessary for the hook to be moveable relative to the support surface of the carrier body; the hook can have a fixed position relative to the support surface of the carrier body.

The initial placement of the carcass part onto the carrier is such that when the positioning element is moved towards its extended position, the dome shaped engagement end will at some point touch the inner face in the region between the left and right margo costalis of the sternum. The dome shaped engagement end of the positioning element will touch the facies visceralis sterni directly, or the inner face of the carcass part adjacent to it. The bone surface of the facies visceralis sterni may lie directly at the inner face but it may alternatively be still be at least partly covered by some tissue, or that tissue fragments are still present on this bone surface. "At or adjacent to the facies visceralis sterni" in this context means that the dome shaped engagement part of the positioning element touches either the bone surface of the facies visceralis sterni directly, or that it touches the tissue or tissue fragments on the bone surface of the facies visceralis sterni.

If for example the carcass part is initially placed on the carrier a bit too far too the right, the dome shaped engaging end will first touch the inner face on the left side (as seen in the direction of movement of the positioning element) when the positioning element moves towards its extended position. As the movement of the positioning element towards its extended position progresses, the dome shaped engagement end of the positioning element will push the carcass part to the left until it touches the inner face of the carcass part in the region between the left and right margo costalis of the sternum on its left side as well as on its right side. When the reaction forces from the carcass part (which is supported by the hook) on the left side and on the right side of the dome shaped engagement end of the positioning element reach an equilibrium, the carcass part is centered onto the positioning element.

This works the same way for carcass parts that are initially placed off centre and onto the carrier in an other direction. The shape of the facies visceralis sterni in the region between the left and right margo costalis of the sternum is so that also deviations in orientation of the carcass part are corrected when the positioning member is moved into its extended position. Practice has shown that deviations in the orientation in the longitudinal plane as well as in the transverse plane of the carcass part are corrected.

The movement of the positioning element from its retracted position to its extended position and vice versa can be achieved in various ways. In one embodiment, it takes place in a "free" manner, in which case the positioning element is resiliently mounted onto the carrier (in particular onto the carrier block), for example by means of a spring. The positioning element in this case finds its position by itself, due to the resilient force on the one hand and the force exerted by the carcass part, the hook, and/or forces during mounting and/or processing on the other hand.

In a different embodiment, the movement of the positioning element takes place in a more controlled way, for example by means of an actuator that drives the positioning element. Such an actuator can for example comprise a pneumatic or hydraulic cylinder or it can be a system with a cam track and a cam follower, or with a lever that is for example operated by guides. The movement of the positioning element can be displacement-controlled or force-controlled, or a combination thereof.

In a possible embodiment of the invention, the hook is moveable between a set-up position and a clamping position. The hook will be in the set-up position when the carcass part is arranged onto the carrier. During or after the movement of the positioning element towards its extended position, the hook will move to its clamping position in which it clamps the carcass part against the carrier body and/or against the positioning element and/or against a holding element (if present). If the hook starts its movement after the positioning element has reached its extended position, in could be that the movement of the hook towards its clamping position forces the positioning element at least somewhat back towards the support surface of the carrier body. This could for example occur when the positioning element is spring loaded and/or spring mounted or otherwise mounted in a resilient manner.

The skilled person will understand that alternatively, it is possible that the hook has a fixed position relative to the support surface of the carrier body.

In a possible embodiment, the dome shaped engagement end of the positioning element is blunt to that it does not penetrate into the sternum. This ensures that the carcass part can move over the dome shaped engagement end of the positioning element when the positioning element is moved towards and into its extended position.

The dome shaped engagement end can be executed in many different ways. Its shape can be spherical or a part of a sphere, but this is not necessary. An elliptical shape, a frustoconical or otherwise blunt conical shape or even an annulus can work too.

For the best performance, the size of the dome shaped engagement end should be adapted to the general dimensions of the inner face of the carcass part in the region between the left and right margo costalis of the sternum. The dome shaped engagement end does not have to match these dimensions exactly or even closely, but the dimensions have to be in proportion. For example, if the width (or diameter) of the dome shaped engagement end is between about 0.5 and about 1.5 times the width of the sternum in the region of the margo costalis, a good positioning of the carcass part of the carrier can be achieved. When the carrier is used to support carcass parts of chickens (e.g. broilers), good results have been achieved with the width or diameter of the dome shaped engagement end of the positioning element being between about 10 mm and about 35 mm, preferably between about 15 mm and about 25 mm, more preferably about 20 mm.

In a possible embodiment, the surface of the dome shaped engagement end of the positioning element is provided with a surface structure. This surface structure could comprise one or more protrusions and/or one or more recesses. Such a surface structure could alter the grip of the dome shaped engagement end on the carcass part, enhancing or reducing it.

In a possible embodiment, the dome shaped engagement end is rotatable about an axis that is substantially parallel to the direction of movement from the retracted position to the extended position of the positioning element.

In a possible embodiment, the carrier comprises one or more additional positioning elements. These elements can be stationary mounted onto the carrier body or they can be moveable relative to the carrier body, for example moveable between a retracted position and an extended position.

Carriers according to the invention can be used in a poultry processing system. In such a system, a conveyor system moves a plurality of carriers along a track. The track takes the carriers along one or more processing stations. At such a processing station at least one processing step can be carried out a carcass part that is supported by a carrier.

For example, one or more processing stations could be used for harvesting breast fillets. Alternatively or in addition, a processing station can be present that is used for halving breast fillets.

The conveyor system could comprise an overhead conveyor with trolleys. Each carrier is connected to the overhead conveyor by a trolley. Preferably, the carrier is moveable relative to the trolley and/or to the overhead conveyor, more preferably moveable in a plurality of planes.

In an other embodiment, the conveyor system comprises a track in the form of an endless loop in a substantially vertical plane. A cable or chain moves the carriers along this track. Each carrier is connected to the track by means of a base. Preferably, the carrier is moveable relative to the base and/or to the conveyor, more preferably moveable in a plurality of planes.

Preferably, the carrier and/or the system according the invention comprise a driver for moving the positioning element from its retracted position to its extended position and/ or from its extended position to its retracted position.

BRIEF DESCRIPTION OF THE DRAWINGS

The invention will be explained in more detail under referral to the drawing, in which non-limiting embodiments of the invention are shown. The drawing shows in:

FIG. 6: mounting of a breast cap onto the carrier of FIG. 4,
FIGS. 7a-7d: mounting of a breast cap onto a carrier according to the invention, in steps, seen from the side,
FIGS. 8a-8e: mounting of a breast cap onto a carrier according to the invention, in steps, seen from the top.

DETAILED DESCRIPTION OF THE INVENTION

Figure 1:
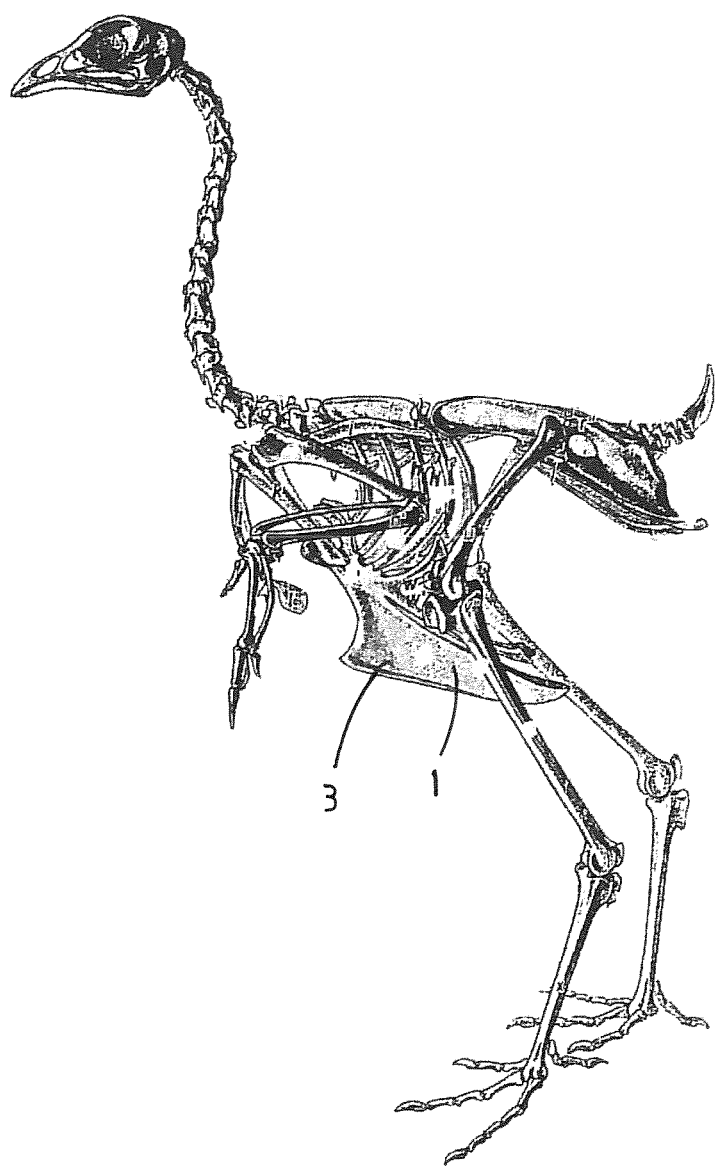
FIG. 1: the skeleton of a chicken, in side view.

FIG. 1 shows a side view of the skeleton of a chicken. This figure shows the position of the sternum 1 (also known as "the breastbone") in relation to the other bones of the chicken. As can be seen in FIG. 1, the sternum 1 has a crest 3 (also knows as "carina sterni") that is pointed downwards when the bird stands upright.

Figure 2:
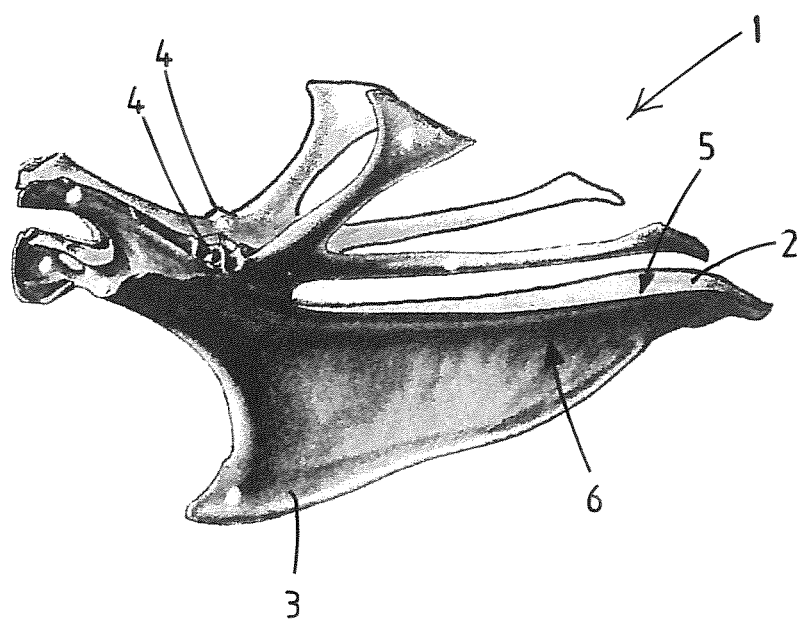
FIG. 2: the sternum of a chicken, in side view.
Figure 3:
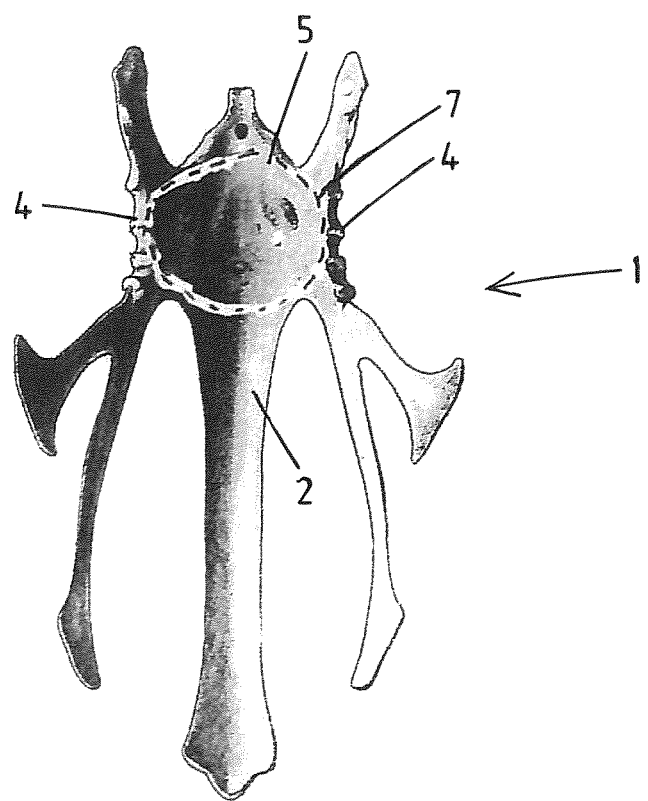
FIG. 3: the sternum of a chicken, seen from the side of the facies visceralis sterni.

FIG. 2 and FIG. 3 show the sternum 1 of a chicken in more detail. The side view of FIG. 2 clearly shows the carina sterni 3 and the corpus sterni 2. The face of the corpus sterni 2 that in a living bird is directed towards the lungs, the viscera and the spine (so: substantially upward in a standing bird) is called the facies visceralis sterni 5. The opposite face of the corpus sterni 2, which face is directed towards the breast muscles of the bird, so substantially downward in a standing bird, is called the facies muscularis sterni 6.

As can be seen in FIGS. 1, 2 and 3 combined, the corpus sterni 2 has a narrow part extending towards the direction of the tail of the bird and a wider part more at the front. On the left and right sides of this wider part, the margo costalis 4 are present.

The positioning element of the carrier according to the invention is adapted to engage the carcass part in the region of this wider part. The positioning element will generally engage the carcass part somewhere in the area that is roughly encircled by dashed line 7.

Figure 4:
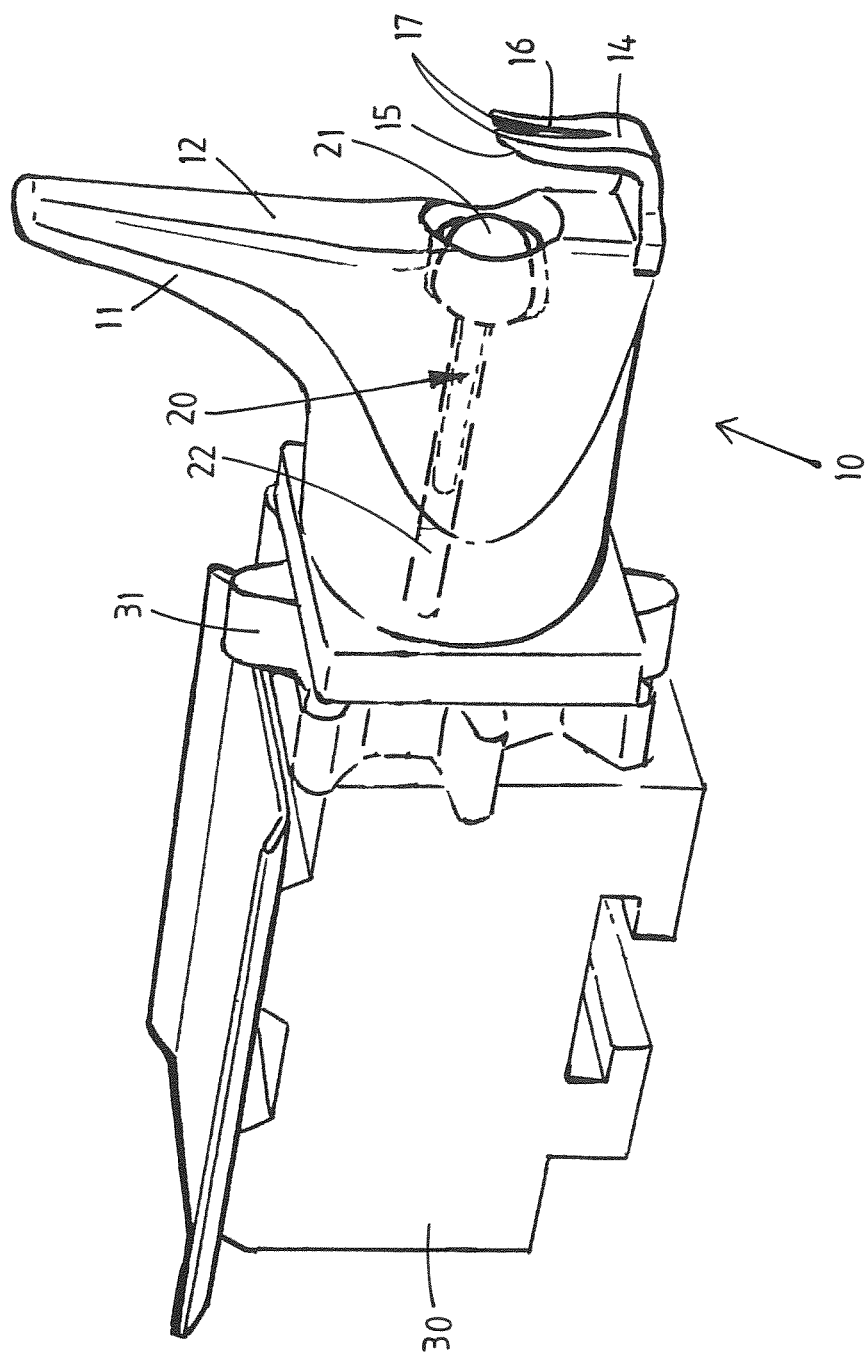
FIG. 4: a first example of a carrier according to the invention.

FIG. 4 shows a first example of a carrier 10 according to the invention. The carrier 10 comprises a carrier body 11. The carrier body 11 has a support surface 12. In use, this support surface 12 engages at least a part of the inner face of a carcass part.

A hook 14 is provided to hold the carcass part on the carrier 10. In the example of FIG. 4, the hook 14 is provided with a slit 16 and sharp tips 17. In this example, the hook further comprises a curved surface 15 on the side of the hook that faces the support surface 12 of the carrier body 11. This curved surface 15 can assist in the positioning of the carcass part relative to the carrier. As can be seen in FIG. 4, in this embodiment the hook 14 has a fixed position relative to the support surface 12 of the carrier body 11.

The carrier body 11 is provided with a recess 22, in which a positioning element 20 has been arranged. The positioning element 20 has a dome shaped engagement end 21.

The positioning element 20 is moveable between a retracted position and an extended position. FIG. 4 shows the positioning element in its retracted position.

Any drive means to move the positioning element 20 between its retracted position and its extended position are not shown in FIG. 4 for reasons of clarity. Examples of such drive means are given in following figures, and the skilled person will know how to carry out such drive means.

In the example of FIG. 4, the carrier 10 is mounted on a base 30. The base 30 can be connected to a conveyor system, e.g. to an endless chain loop of a conveyor system. In the example of FIG. 4, a gear wheel 31 has been provided between the base 30 and the carrier body 11. This gear wheel 31 allows the carrier 10 to be rotated relative to the base 30. The gear wheel 31 can be actuated by actuators arranged alongside the track that is followed by the carrier 10 when it is transported by the conveyor system.

Figure 5:
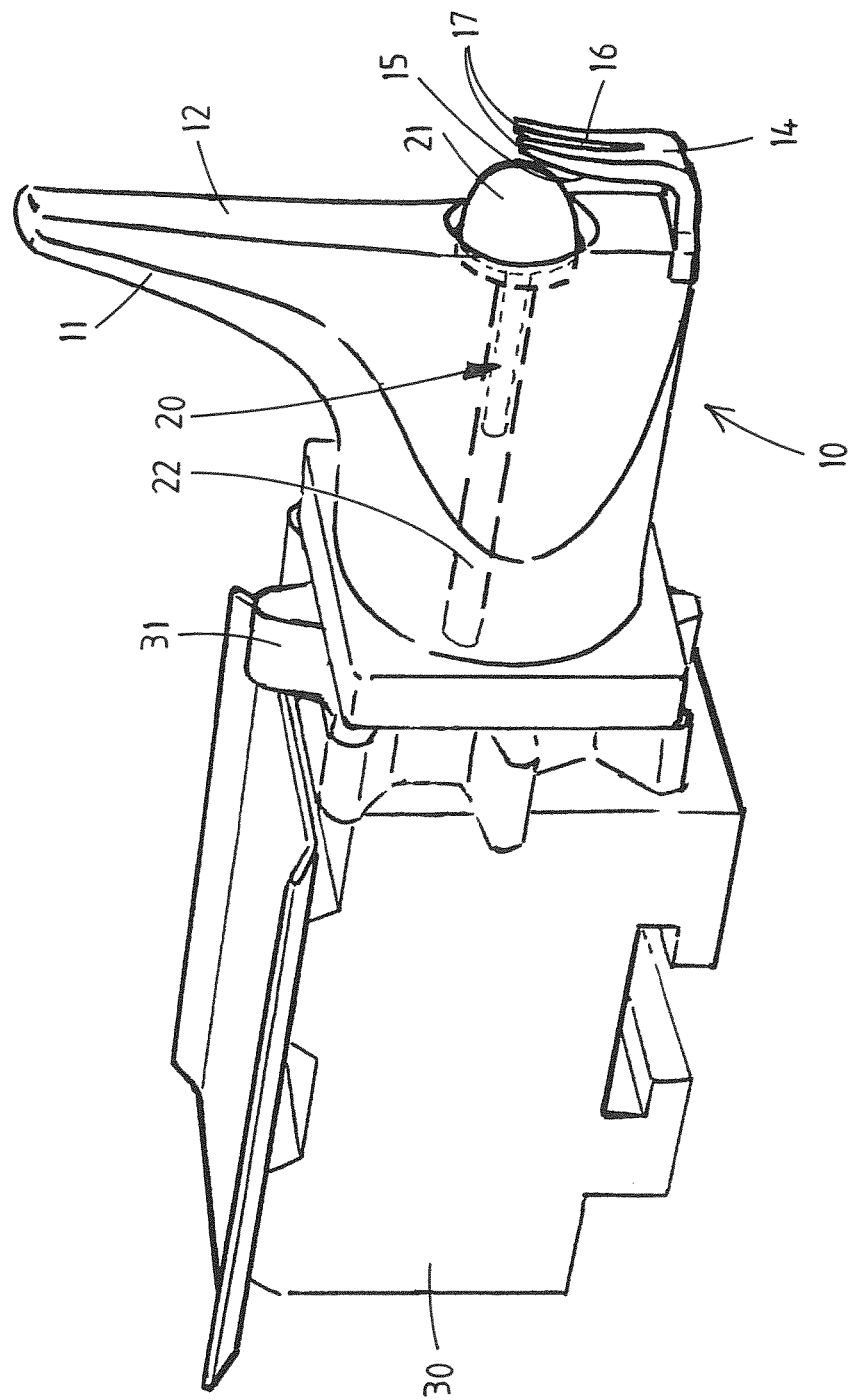
FIG. 5: the embodiment of the carrier of FIG. 4, but with the positioning element in its
extended position.

FIG. 5 shows the embodiment of the carrier of FIG. 4, but with the positioning element 20 in its extended position. In its extended position, the dome shaped engagement end 21 protrudes from the support surface 12 of the carrier body 11.

FIG. 6 shows the mounting of a breast cap 50 onto the carrier of FIG. 4. The breast cap 1 has an inner face 51 and an outer face 52. FIG. 6 indicates the position of the sternum 1 in the breast cap.

FIG. 7 shows the mounting of a breast cap 50 onto a carrier 10 step-by-step.

In FIG. 7A, the breast cap 50 approaches the carrier 10. The positioning element is in its retracted position.

In FIG. 7B, the breast cap 50 is places loosely on the carrier 10. The hook 14 penetrates into the meat behind the sternum 1, so on the side of the facies muscularis sterni 6. In the situation of FIG. 7B, the breast cap is placed somewhat too high on the carrier 10. The breast cap 50 is not fixated by the hook in the situation of FIG. 7B. In this respect, it is advantageous if the hook 14 is somewhat shorter (in vertical direction as seen in accordance with FIG. 7B) than in know carriers such as the one of EP0254332. The difference is length as compared to the known carrier preferably is between about 3 and about 15 mm, more preferably between about 5 and about 10 mm. In the situation of FIG. 7B, the positioning element is still in its retracted position.

Figure 7D:
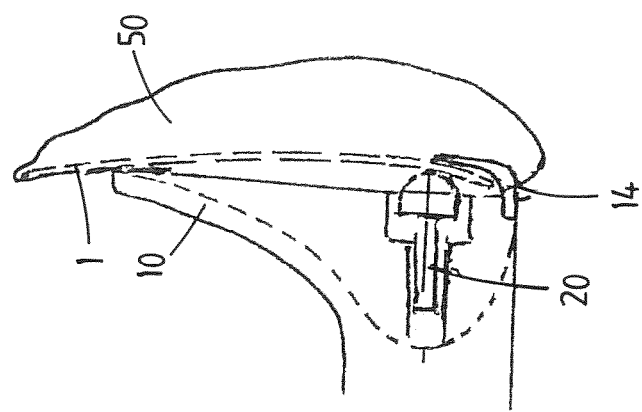
Figure 7C:
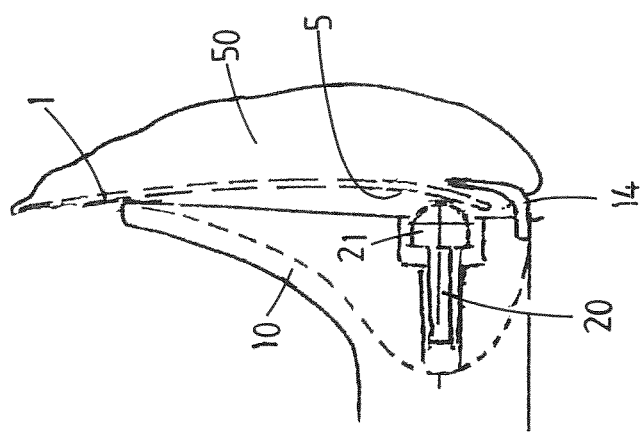

In FIG. 7C, the positioning element 20 moves forward from its retracted position towards its extended position. In FIG. 7C, the dome shaped engagement end 21 has not reached its fully extended position yet. The dome shaped engagement end 21 starts to engage the facies visceralis sterni 5 of the corpus sternum 2 in FIG. 7C. The hook 14 prevents that the positioning element 20 pushes the breast cap off the carrier 10.

From the position shown in FIG. 7C, the positioning element 20 moves further forward to its fully extended position as shown in FIG. 7D. During this movement, the breast cap 50 moves downward under the influence of the force the positioning element 20 exerts on the facies visceralis sterni 5 of the corpus sternum 2. The breast cap 50 this way becomes positioned in a reliable and reproducible way onto the carrier 10, and is held firmly in this position under the combined action of the positioning element 20 and the hook 14.

When comparing the FIGS. 7A, 7B, 7C, and 7D, it is clear that the hook 14 maintains a fixed position relative to the support surface of the carrier body.

FIG. 8 demonstrates how a breast cap 50 is centered relative to the carrier 10 by the positioning element 20 when the breast cap is initially arranged off center on the carrier. FIG. 8 shows a top view of the carrier 10 and the breast cap 50 in cross section at the level of the centre of the positioning element 20.

Figure 8B:
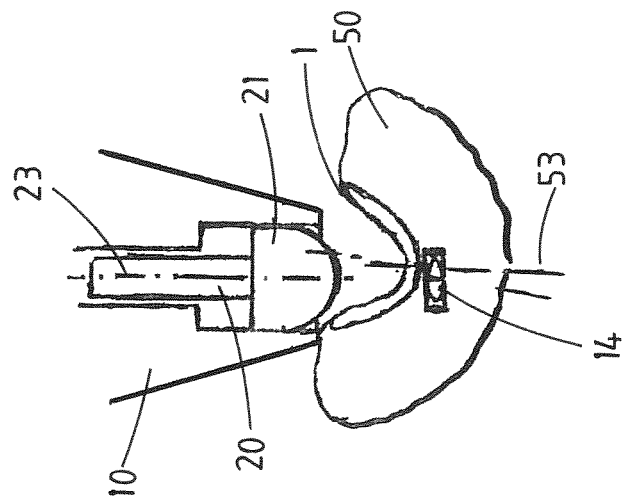
Figure 8A:
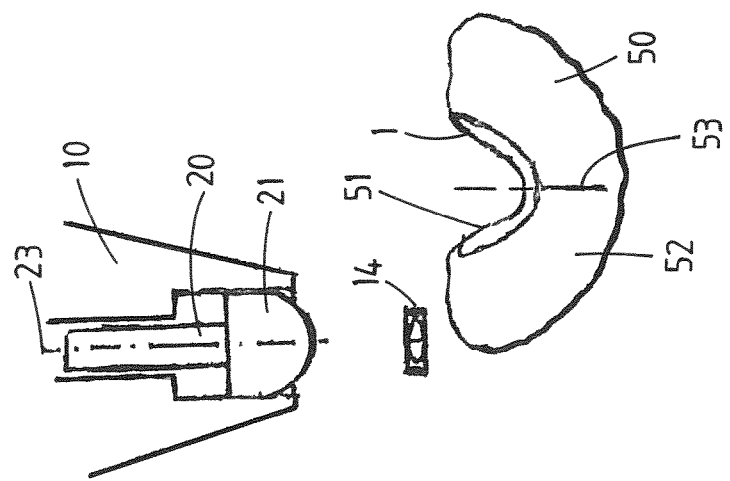

FIG. 8A shows the situation before the breast cap 50 is arranged on the carrier 10. The sternum 1 is shown, as well as the positioning element 20 with its dome shaped engagement end 21 and the hook 14. In FIG. 8A, the positioning element 20 is in its retracted position.

Reference numeral 23 indicates the center line of dome shaped engagement end 21 of the positioning element 20 and reference numeral 53 indicates the centre line of the breast cap 50.

FIG. 8B shows the situation in which the breast cap 50 is arranged initially on the carrier 10. As can be seen in FIG. 8B, the initial position of the breast cap 50 onto the carrier is not entirely correct or optimal: the breast cap is placed too far to the right and not entirely straight. The center line 23 of the dome shaped engagement end 21 and the center line 53 of the breast cap are not in line with each other, and they are offset relative to each other.

In the situation of FIG. 8B, the hook 14 already engages the breast cap 50 (it even penetrates it in this example), but this engagement is such that it still allows some movement of the breast cap relative to the carrier, and preferably also relative to the hook 14.

Figure 8D:
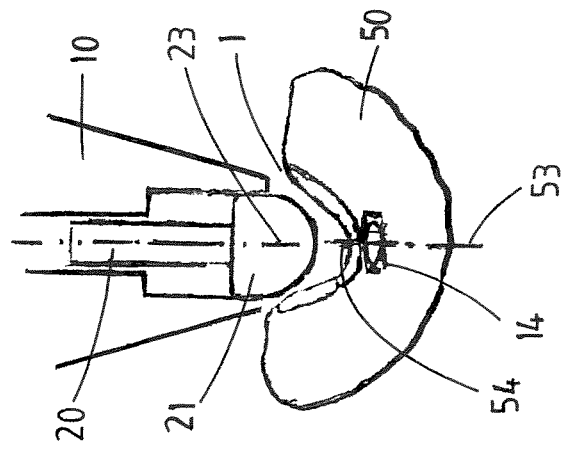
Figure 8C:
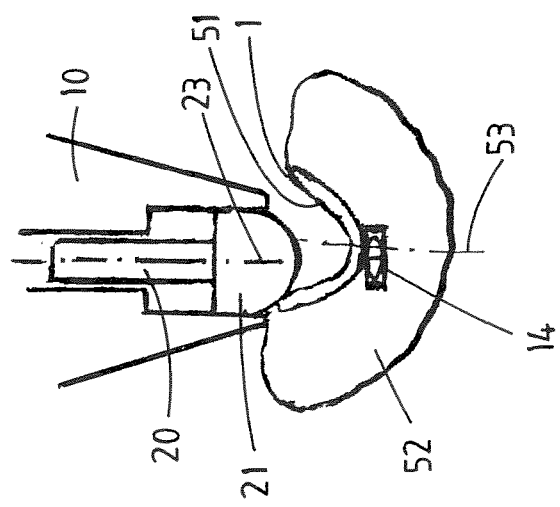

FIG. 8C shows the next step. The positioning element 20 is now moved forward from its retracted position in the direction of its extended position. FIG. 8C shows the point where the dome shaped engagement end 21 first contacts the inner face 51 of the breast cap 50. As can be seen in FIG. 8C, the dome shaped engagement end 21 first touches the inner face 51 of the breast cap 50 at one side.

FIG. 8D shows what happens when the positioning element 20 progresses further towards its fully extended position. The movement of the positioning element 20 makes that the dome shaped positioning element goes deeper into the space defined by the shape of the sternum. In doing so, the point of contact between the dome shape engagement end 21 and the inner face 51 moves in the direction of the deepest point 54. Because the hook 14 provides a counter force against the force of the positioning element 20 (due to the forward movement of the positioning element 20) on the breast cap 50, the breast cap will slide to the left and turn about its axis perpendicular to the plane of the drawing.

FIG. 8E shows the positioning element 20 in its fully extended position. The dome shaped engagement end 21 now touches the inner face 51 of the breast cap on the left side and on the right side of its centre line, and the centre line 23 of the dome shaped engagement end 21 and the centre line 53 of the breast cap are in parallel and no longer offset relative to each other.

When comparing the FIGS. 8A, 8B, 8C, 8D and 8E, it is clear that the hook 14 maintains a fixed position relative to the support surface of the carrier body.

FIG. 8 clearly shows that the radius of curvature of the dome shaped end 21 and the radius of curvature of the inner face 51 of the breast cap 50 can be different from each other. It is not necessary for these radiuses to be identical to make the invention work. This allows a the carrier according to the invention be used for a large variety of sizes of carcass parts.

FIG. 9 shows a further embodiment of the carrier and the method according to the invention. In this embodiment, the hook 14 is moveable relative to the carrier body 11.

Figure 9B:
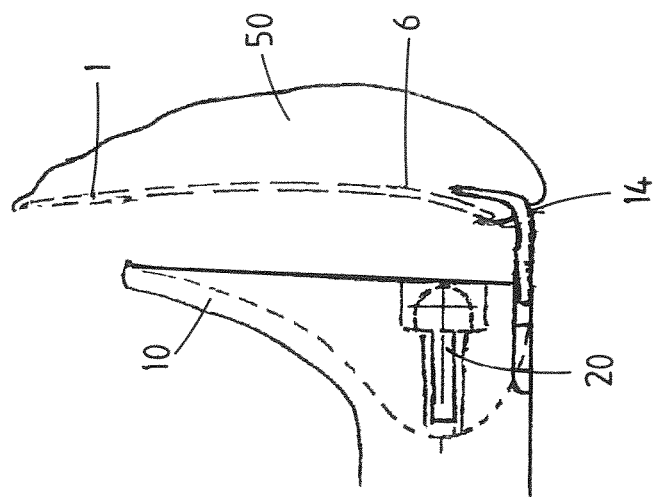
FIGS. 9a-9d: mounting of a breast cap onto an alternative embodiment of carrier according to the invention, in steps, seen from the side.
Figure 9A:
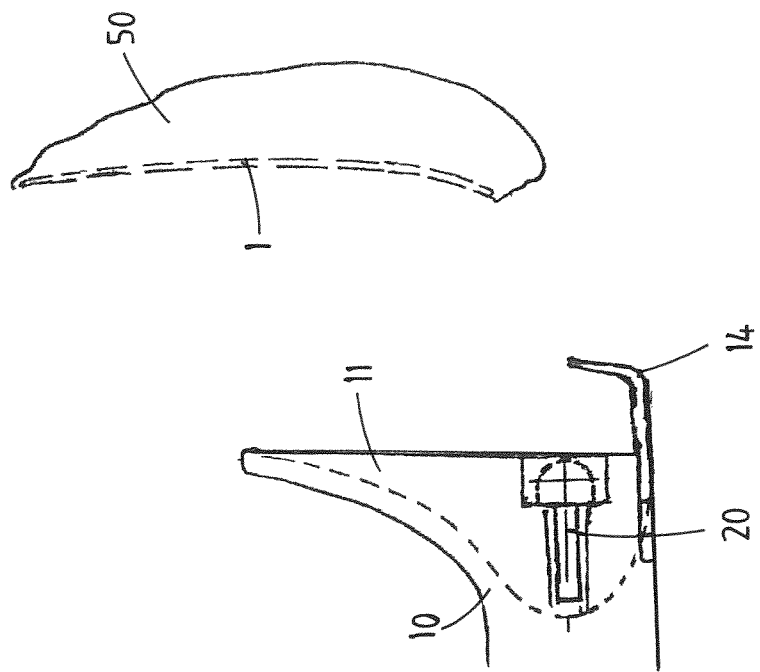

In FIG. 9A, the breast cap 50 is brought to the carrier 10. The positioning element 20 is in its retracted position, while the hook 14 is in its set-up position. In the set-up position, the distance between the hook 14 and the support surface 12 of the carrier body 11 is relatively large.

In FIG. 9B, the breast cap 50 is placed loosely on the hook 14 of the carrier 10. The hook 14 penetrates into the meat behind the sternum 1, so on the side of the facies muscularis sterni 6. In the example of FIG. 9B, the breast cap is placed somewhat too high on the carrier 10. The breast cap 50 is not fixated by the hook in the situation of FIG. 9B. In the situation of FIG. 9B, the positioning element is still in its retracted position.

Figure 9C:
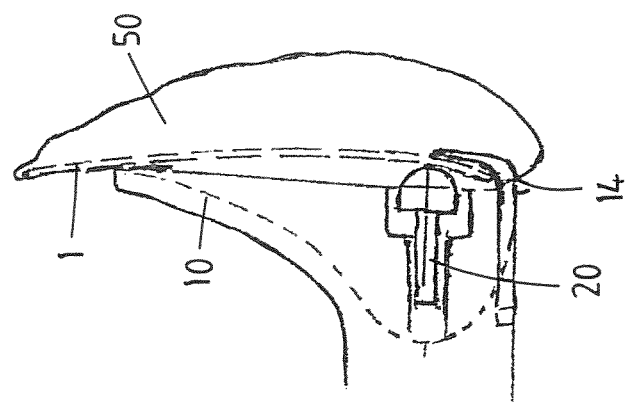

FIG. 9C shows the next step. The positioning element 20 moves forward from its retracted position towards its extended position. In FIG. 9C, the dome shaped engagement end 21 has not reached its fully extended position yet. Also the hook 14 is moving. The hook 14 moves from its set-up position to its clamping position. The movements of the positioning element 20 and the hook can take place simultaneously, partly simultaneously or sequentially. When the movements are carried out (partially) sequentially, it is preferred that first the hook moves and then the positioning element, but this is not necessary.

The dome shaped engagement end 21 starts to engage the facies visceralis sterni 5 of the corpus sternum 2 in FIG. 9C. The hook 14 prevents that the positioning element 20 pushes the breast cap off the carrier 10.

Figure 9D:
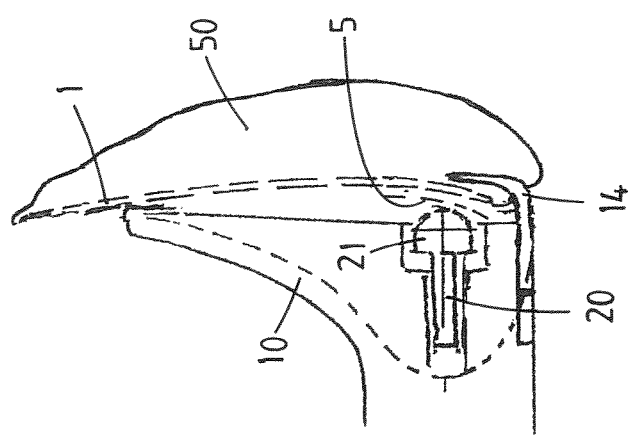

From the position shown in FIG. 9C, the positioning element 20 moves further forward to its fully extended position as shown in FIG. 9D. The hook moves into its clamping position, which is shown in FIG. 9D. During the movements, the breast cap 50 moves downward under the influence of the force the positioning element 20 exerts on the facies visceralis sterni 5 of the corpus sternum 2. The breast cap 50 this way becomes positioned in a reliable and reproducible way onto the carrier 10, and is held firmly in this position under the combined action of the positioning element 20 and the hook 14.

In a possible embodiment, it is just the hook 14 that fixes the position of the breast cap 50 after it has been positioned by the dome shaped engagement end of the positioning element. In that case, the positioning element 20 is retracted from its extended position when the hook is in its clamping position.

In the examples of FIGS. 6, 7, 8 and 9, a breast cap 50 is mounted onto the carrier 10. It is however also possible that the embodiments shown in these figures are used for front halves or other carcass parts that comprise an inner face and an outer face, at least a part of the corpus sterni of the sternum, the corpus sterni comprising at least a part of the facies visceralis sterni, and at least a part of the facies muscularis sterni, and the inner face being on the same side of the sternum as the facies visceralis sterni and the outer face being on the same side of the sternum as the facies muscularis sterni, which carcass parts are engaged at the inner face.

Figure 10:
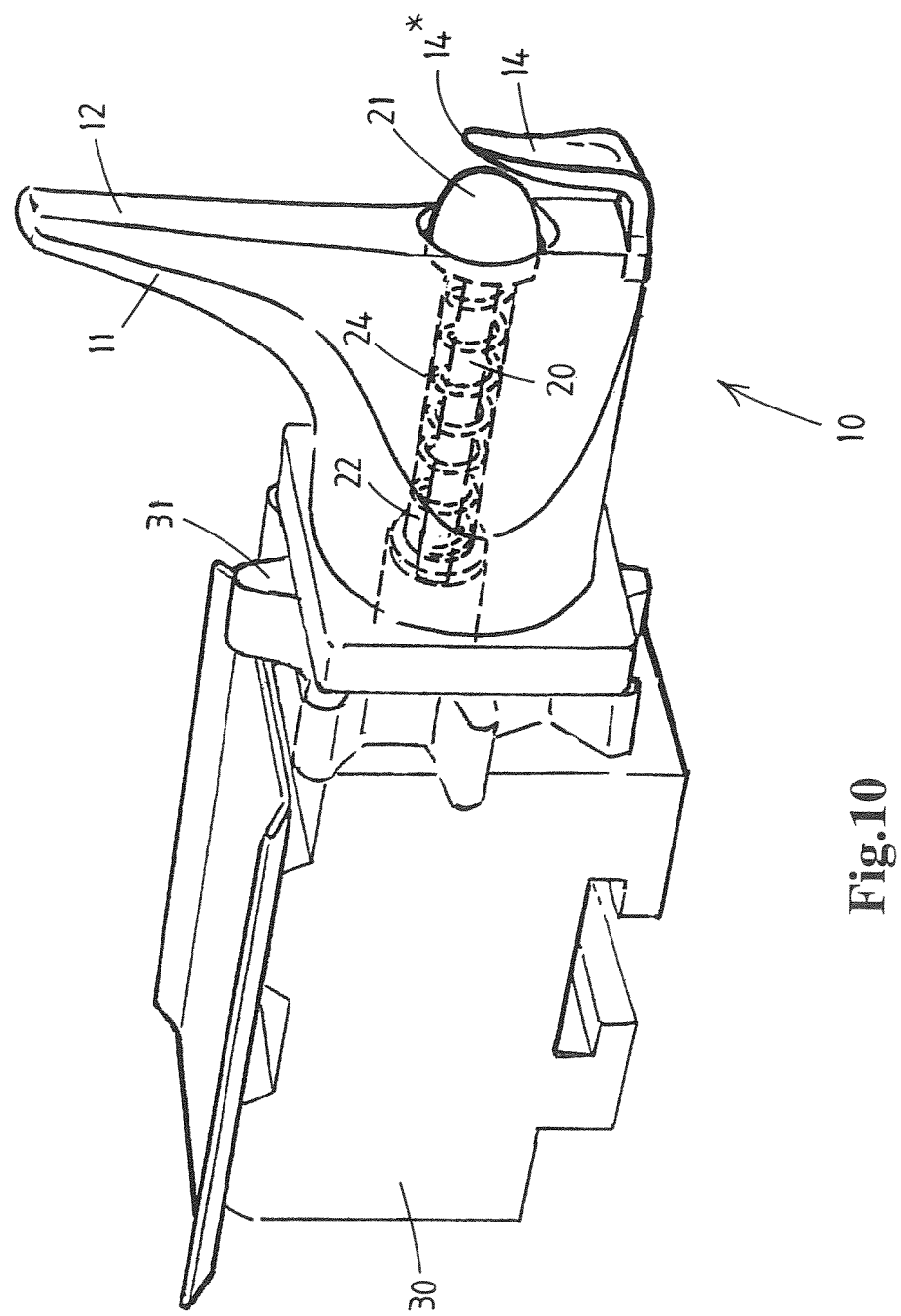
FIG. 10: an alternative embodiment of a carrier according to the invention.

FIG. 10 shows a further embodiment of the carrier according to the invention. In this embodiment, a hook 14 has been used that does not have a slit as the one shown for example in FIG. 5. However, its function is the same. Preferably, the top edge 14* is sharp, such that it can easily penetrate into the carcass part. The solid hook as shown in FIG. 10 can be used in combination with any of the embodiments disclosed in this application. The solid hook of FIG. 10 and the slit hook of FIG. 5 are mutually exchangeable. Preferably, the solid hook has a curved surface 15 on the side facing the support surface of the carrier body just like the slit hook.

In the embodiment of FIG. 10, the positioning element 20 is mounted on a spring 24. In variants to this embodiment, other constructional measures are applied to make the dome shaped engagement end to be mounted resiliently to the carrier body, e.g. by means of a gas spring. The arrangement is such that the positioning element 20 is biased towards its extended position. When a carcass part is arranged onto the carrier of FIG. 10, the positioning element 20 moves back into a retracted position because the part of the carcass part that is inserted between the hook 14 and the support surface 12 forces the positioning element 20 away from the hook. When carcass part is arranged onto the carrier, the spring (or an other resilient element or element that gives the dome shaped engagement end resiliency) forces the positioning element 20 back into its extended position. By this movement of the positioning element 20 back to its extended position, the carcass part gets positioned by the dome shaped engagement end 21 of the positioning element.

This embodiment is fairly simple, but its downside is that arranging the carcass part onto the carrier requires some extra force because the positioning element has to be moved out of the way.

Figure 11:
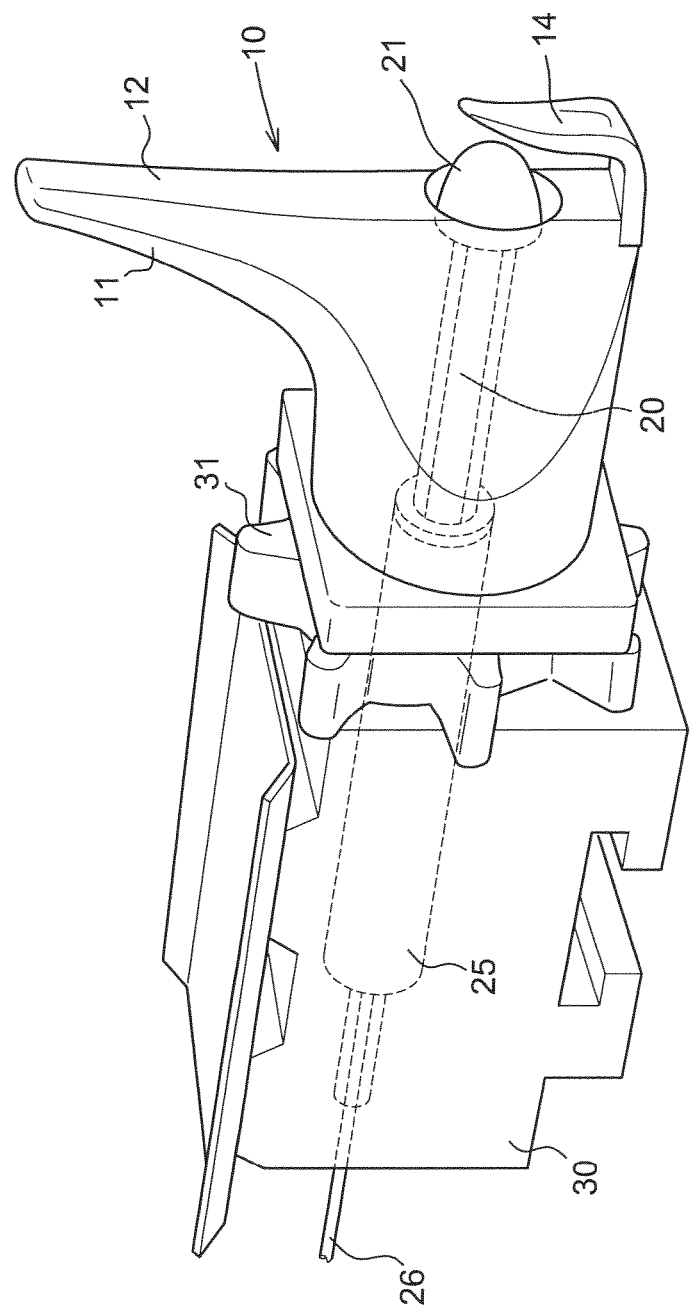
FIG. 11: a further alternative embodiment of a carrier according to the invention.

FIG. 11 shows a further embodiment of a carrier according to the invention. In this embodiment, the carrier 10 is fitted with a cylinder 25 for moving the positioning element from its retracted position to its extended position and from its extended position to its retracted position. The cylinder can be a hydraulic cylinder or a pneumatic cylinder. Hydraulic fluid or gas (e.g. air) can be supplied to the cylinder (or released from the cylinder if required) by means of connection 26.

Figure 12:
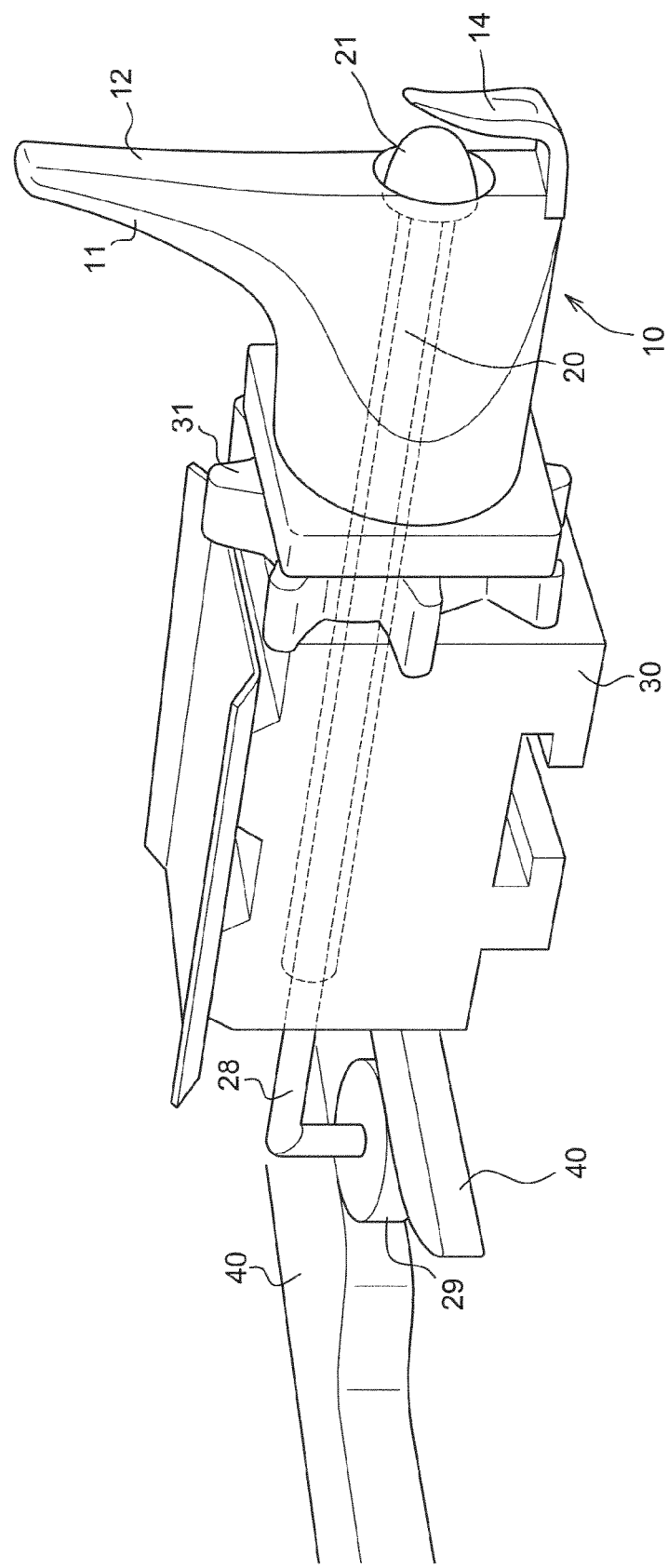
FIG. 12: a further alternative embodiment of a carrier according to the invention.

FIG. 12 shows a further embodiment of a carrier according to the invention. In this embodiment, the positioning element 20 comprises a drive rod 28. A cam wheel 29 is connected to the drive rod 28. Guides 40 are arranged adjacent a track along which the carrier is moved. The guides 40 move the cam wheel 29 relative to the carrier body. The motion of the cam wheel 29 is transferred to the positioning element 20, which is therewith moved between its retracted position and its extended position.

Any one of the drive means of FIG. 10, 11 or 12 can be combined with any one of the embodiments of the invention as disclosed in this application.

Figure 13:
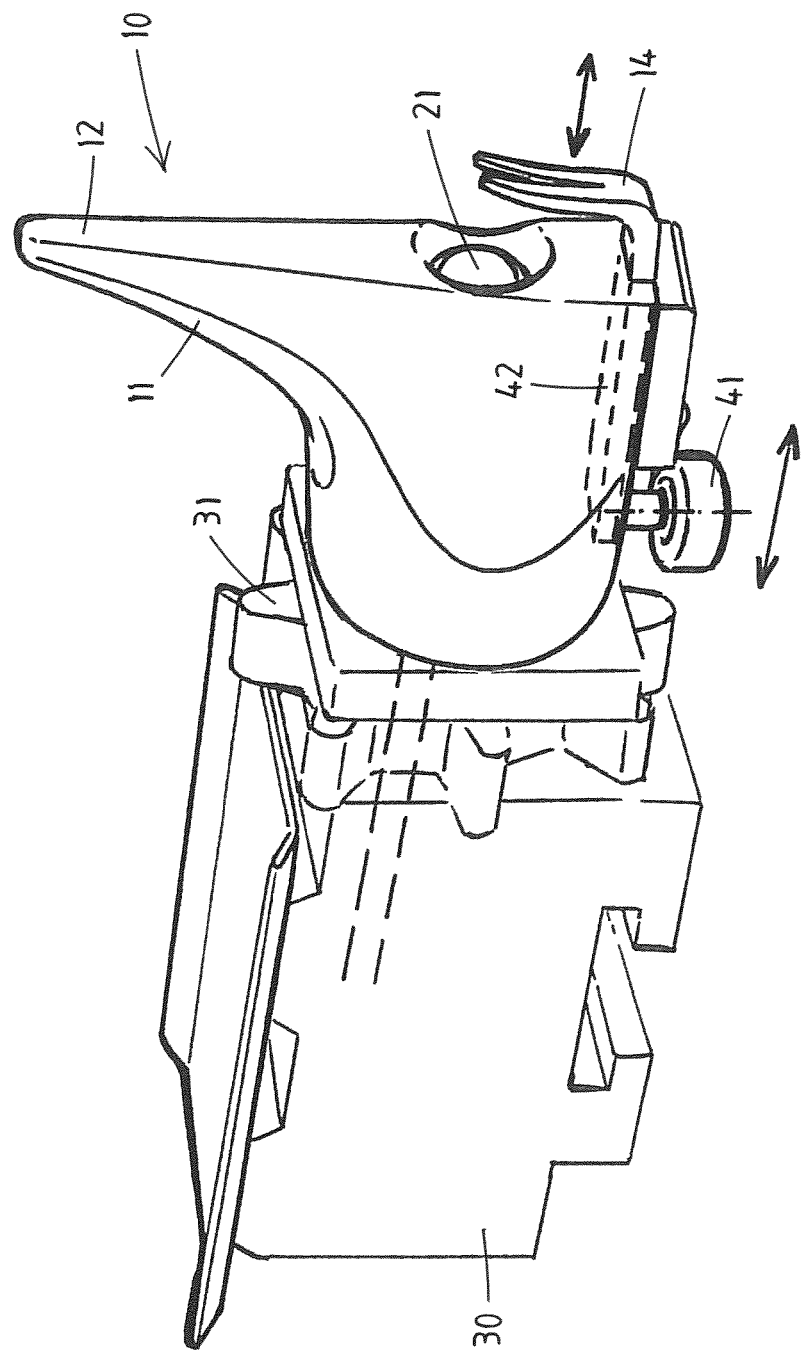
FIG. 13: a further alternative embodiment of a carrier according to the invention

FIG. 13 shows a further embodiment of a carrier according to the invention. In this embodiment, the hook 14 is moveable relative to the carrier body 11. This allows the carrier to be used as described in relation to FIG. 9.

FIG. 13 shows a way of actuating the hook 14. The hook 14 is connected to a drive bar 42, which carries a cam wheel 41. The cam wheel 41 can be actuated by guides that are arranged adjacent the carrier (not shown). These guides can be stationary while the carrier moves by these guides when the carrier is moved along a track. Alternatively, the carrier can be stationary while the guides move by.

The motion of the cam wheel 41 is transferred to the hook 14 by the drive bar 42. This way, the hook can be moved between its set-up position and its clamping position.

All embodiments shown so far have a hook that penetrates into the carcass part that is supported by the carrier. However, it is not necessary that the hook penetrates into the carcass part. It is also possible that the hook engages the carcass part on its outer face 52.

For embodiments that have such a hook that engages the outer face of the carcass part, it is advantageous that the hook is moveable between a set-up position and a clamping position. The hook is in the set-up position when the carcass part is initially arranged onto the carrier, and after positioning the hook in the clamping position holds the carcass part firmly against the carrier.

Figure 14:
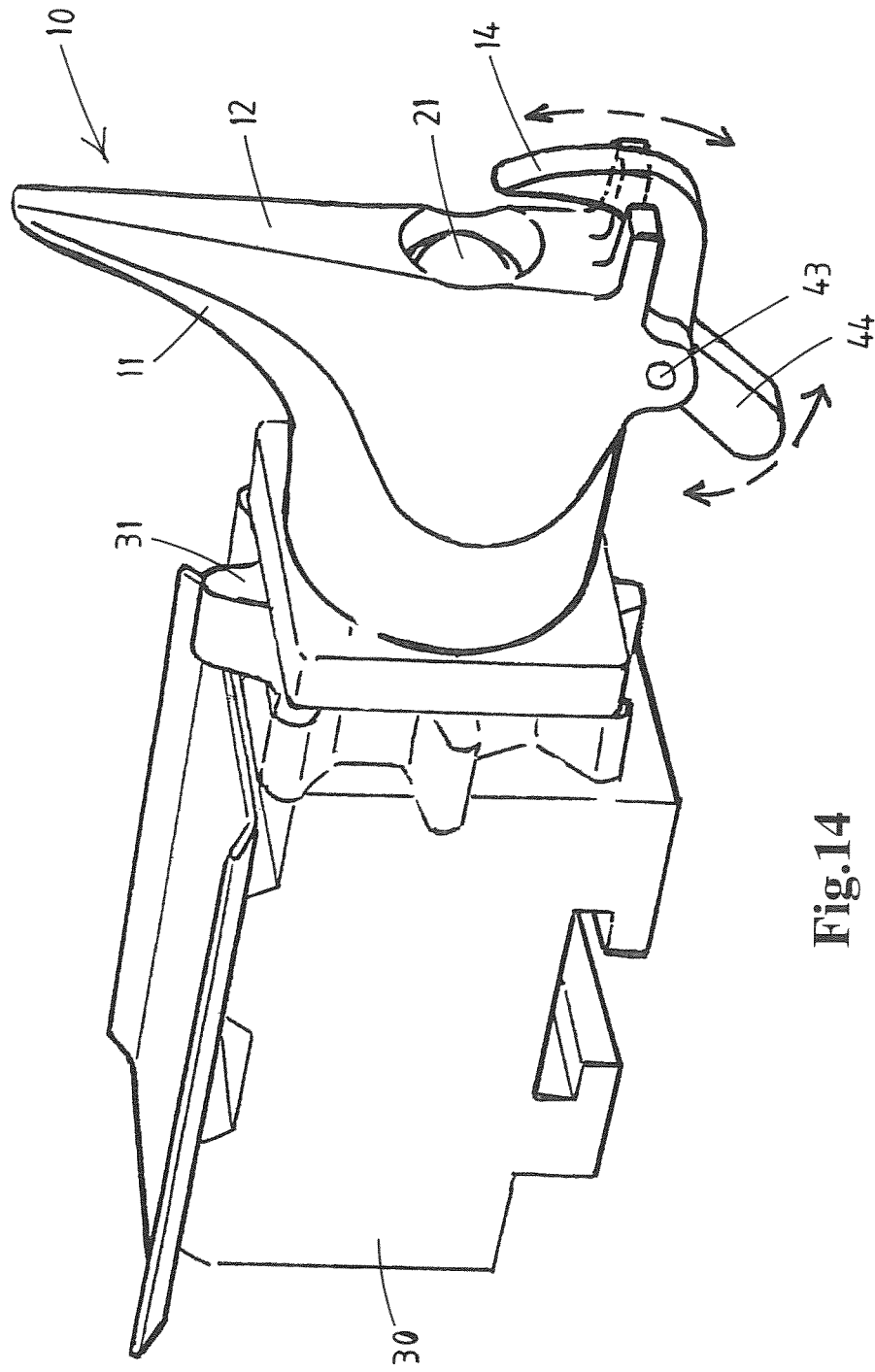
FIG. 14: a further alternative embodiment of a carrier according to the invention.

FIG. 14 shows an example of an embodiment that has a hook that engages the outer face of the carcass part.

In the example of FIG. 14, the hook 14 is moved between its set-up position and its clamping position by means of a lever 44 that is pivotable about pivot axis 43.

The lever 44 can for example be actuated by means of guides that are arranged adjacent the carrier (not shown). These guides can be stationary while the carrier moves by these guides when the carrier is moved along a track. Alternatively, the carrier can be stationary while the guides move by.

Figure 15:
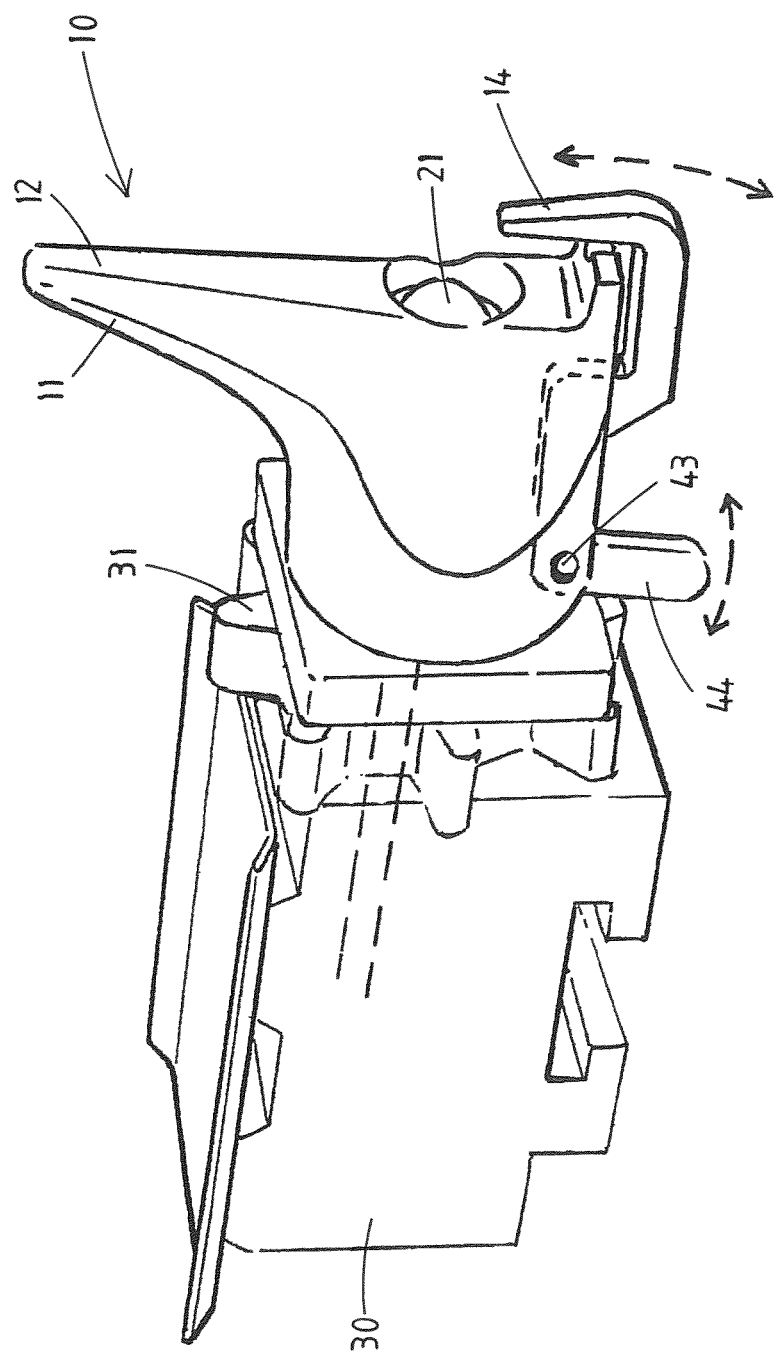
FIG. 15: a variant of the embodiment according to FIG. 14,
FIGS. 16a-16f: examples of embodiments of the dome shaped engagement end of the positioning element.

FIG. 15 shows a variant of the embodiment of FIG. 14. In the embodiment of FIG. 15. the lever 44 has a different shape, which results in a different path of the hook 14 between its set-up position and its clamping position.

Figure 16:
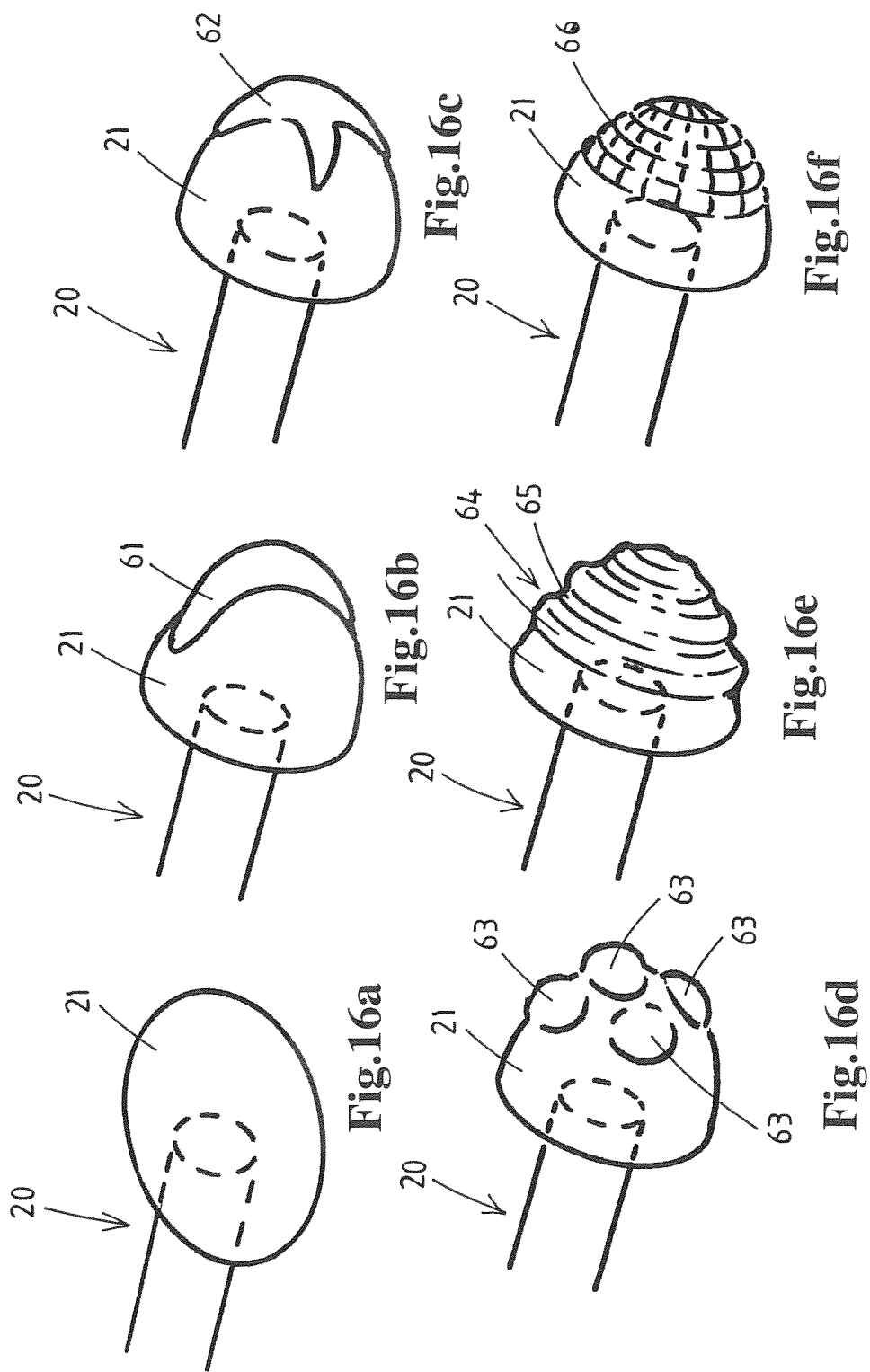

In the examples of the carrier according to the invention shown so far, the dome shaped engagement end 21 of the positioning element 20 has been substantially spherical or in the form of a rounded cone. FIG. 16 shows some examples of possible variants to the shape of the dome shaped engagement end 21.

In FIG. 16A, the dome shaped engagement end 21 has an elliptical shape. The advantage of that is that due to its elongated shape, it improves the correction of flaws in the orientation of the carcass part that occur when the carcass part is initially placed on the carrier.

In FIG. 16B, the dome shaped engagement end 21 is provided with a crest 61. This crest 61 is also helpful in obtaining the correct orientation of the carcass part relative to the carrier.

In FIG. 16C, the dome shaped engagement end 21 is provided with a star shaped protrusion 62. This could improve the grip of the dome shaped engagement end 21 on the carcass part.

In FIG. 16D, the dome shaped engagement end 21 is provided with a number of spheres 63. This too could improve the grip of the dome shaped engagement end 21 on the carcass part.

In FIG. 16E, the dome shaped engagement end 21 is provided with a series of ridges 64 and grooves 65. This too could improve the grip of the dome shaped engagement end 21 on the carcass part.

In FIG. 16F, the dome shaped engagement end 21 is provided with pattern of grooves 66. This also could improve the grip of the dome shaped engagement end 21 on the carcass part.

A dome shaped engagement end 21 according to any of the examples of FIG. 16 can be applied in any of the embodiments of the invention disclosed in this application.

Figure 17:
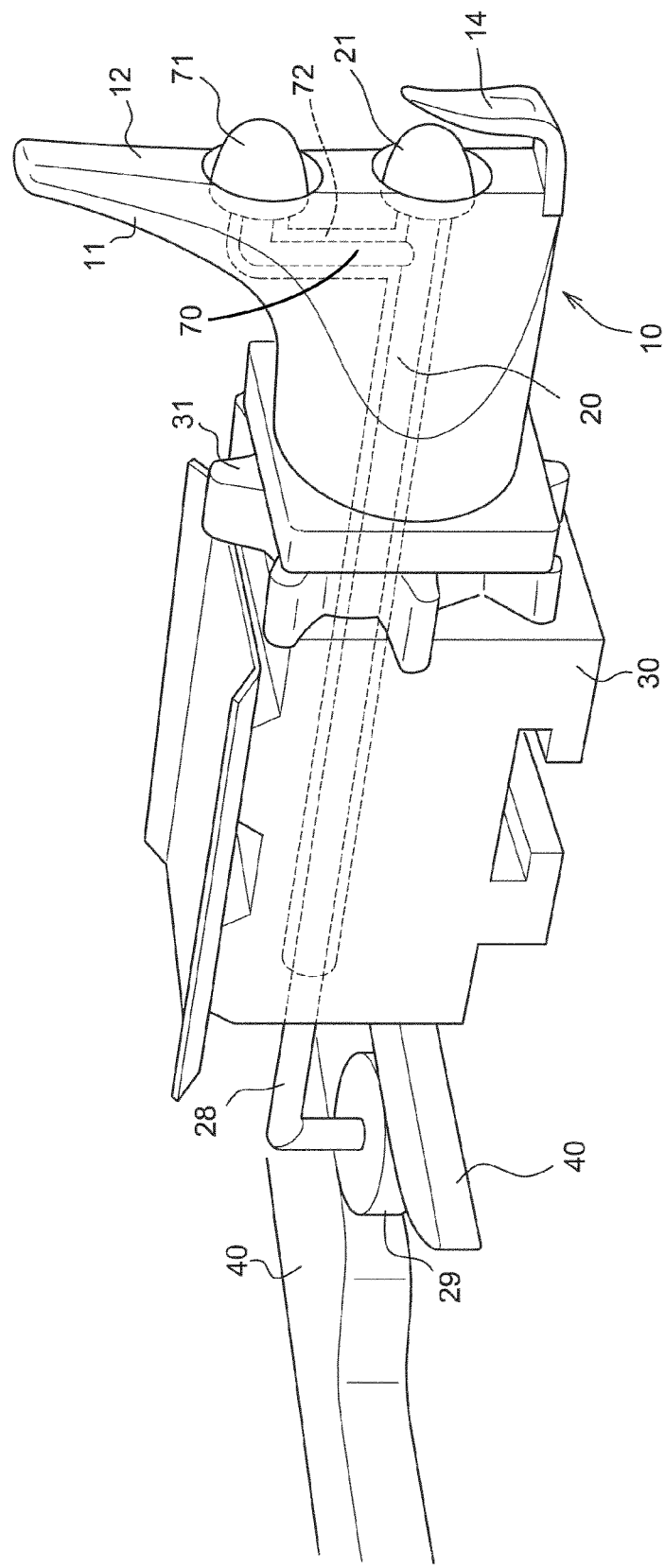
FIG. 17: a further alternative embodiment of a carrier according to the invention.

FIG. 17 shows a further embodiment of a carrier according to the invention. In the embodiment of FIG. 17, the positioning element 20 is provided with an branch 70. A second dome shaped engagement end 71 is provided on the free end of the branch 70. A further recess 72 is made in the carrier body 11 so that the branch 70 and the second dome shaped engagement end 71 can move along with the first dome shaped engagement end 21 between the retracted position and the extended position.

The advantage of the embodiment of FIG. 17 is that it corrects flaws in the initial orientation of the carcass part relative to the carrier such that the longitudinal direction of the sternum comes to lie substantial parallel to the virtual line that can be drawn though the two dome shaped engagement ends 21, 71.

In a variant to the embodiment of FIG. 17, two separate positioning elements 20, each having its own dome shaped engagement end 21, can be provided in the carrier 10.

The positioning element 20 with the two dome shaped engagement ends 21, 71 or a double positioning element can de applied in any of the embodiments of the invention disclosed in this application.

In known carriers, regularly holding elements, for example in the form of sharp pins are applied to fix the carcass part relative to the carrier. Such sharp tipped holding pins are generally in a fixed position relative to the carrier body.

Sharp tipped holding pins of this kind could be applied in a carrier according to the invention, but in some cases they could hinder the positioning of the carcass part as to be performed by the positioning element.

Figure 18:
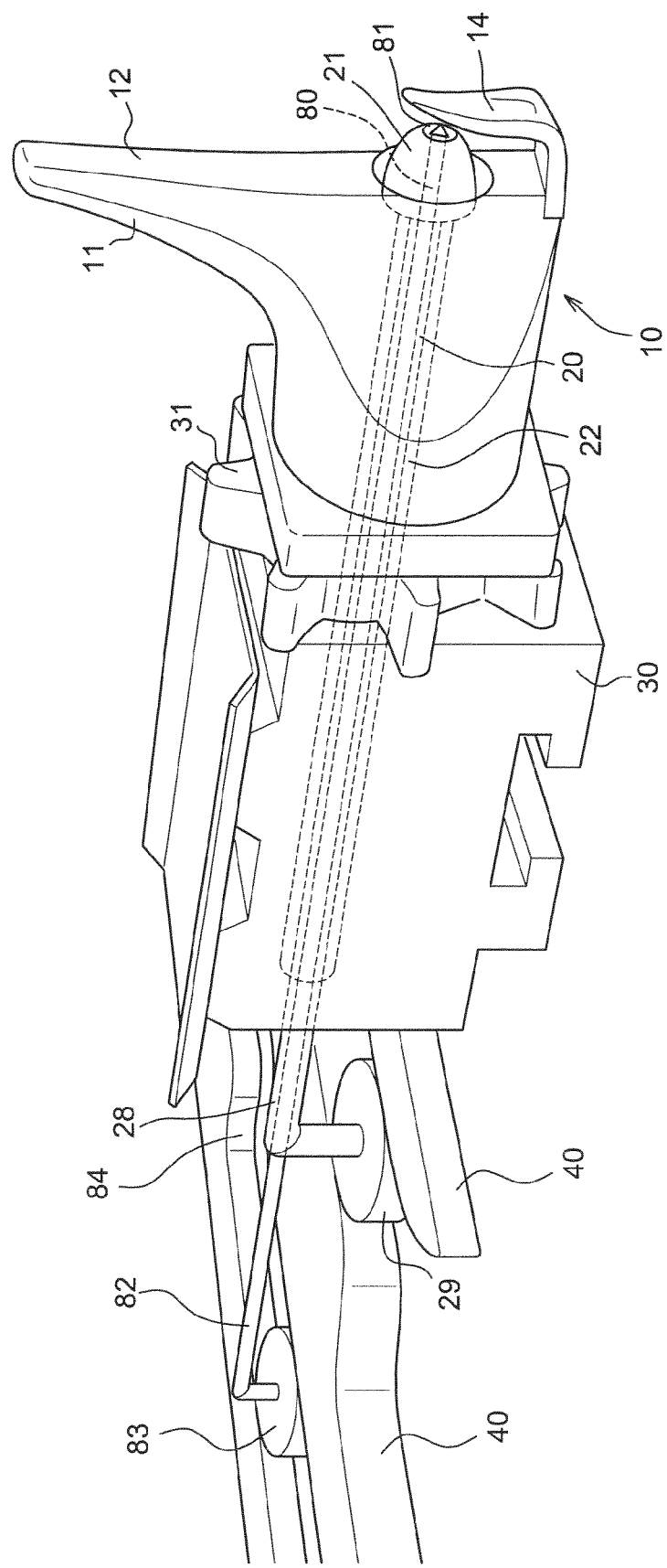
FIG. 18: a further alternative embodiment of a carrier according to the invention.

The embodiment of FIG. 18 allows full positioning of the carcass part as to be performed by the positioning element in accordance with the invention, but also provides the improved fixation as can be reached by one or more holding elements.

The embodiment of FIG. 18 comprises a movable holding element 80, that in this example is provided with a sharp tip 81. In the example of FIG. 18, the holding element 80 is arranged in the positioning element 20, but as an alternative, it could also be arranged elsewhere in the carrier body 11.

The holding element is moveable between a retracted position and an extended position. In the retracted position, it does not grip the carcass part. The retracted position could for example be such that the sharp tip 81 of the holding element does not protrude from the surface of the dome shaped engagement end 21 or from support surface 12 of the carrier body 11.

The holding element 80 stays in its retracted position while the positioning element 20 positions the carcass part on the carrier. When the carcass part positioned by the positioning element 20, the holding element 80 is moved into its extended position. In its extended position, the holding element 80 grips the carcass part and fixates its position and/or orientation relative to the carrier. The gripping can for example be done by making the sharp tip 81 protrude from the surface of the dome shaped engagement end 21 or the support face 12 of the carrier.

In the embodiment of FIG. 18, the holding element 80 is actuated by drive rod 82, to which cam wheel 83 is attached. The cam wheel 84 follows a cam path 84.

Of course, this is just one example of how to drive the holding element between its retracted and its extended position.

FIG. 19 shows how the holding element 80 can be applied in the embodiment of FIG. 8. FIG. 19A-19E shown the same steps as FIG. 8A-8E. As can be seen in FIG. 19A-E, during all these steps, the holding element 80 lies retracted in the positioning element 20. The holding element 80 moves along with the positioning element 20 when the positioning element 20 moves forward to position the carcass part 50, but the sharp tip 81 of the holding element remains below the surface of the dome shaped engagement end 21.

Figure 19B:
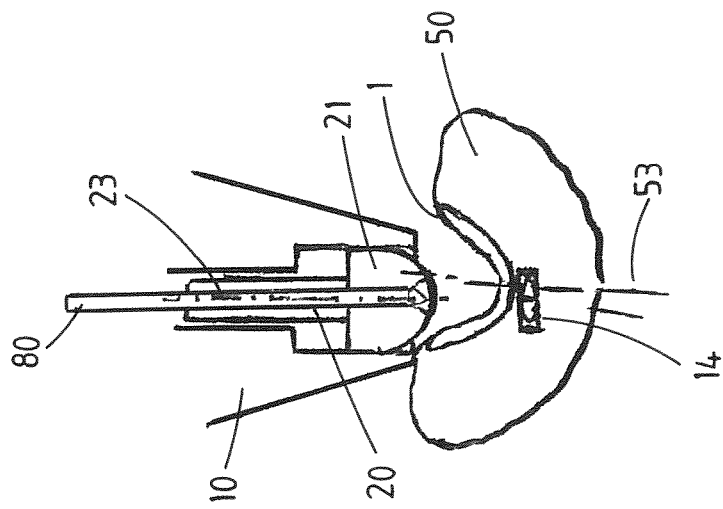
FIGS. 19a-19f: mounting of a breast cap onto a carrier according to FIG. 18, in steps, seen from the top.
Figure 19A:
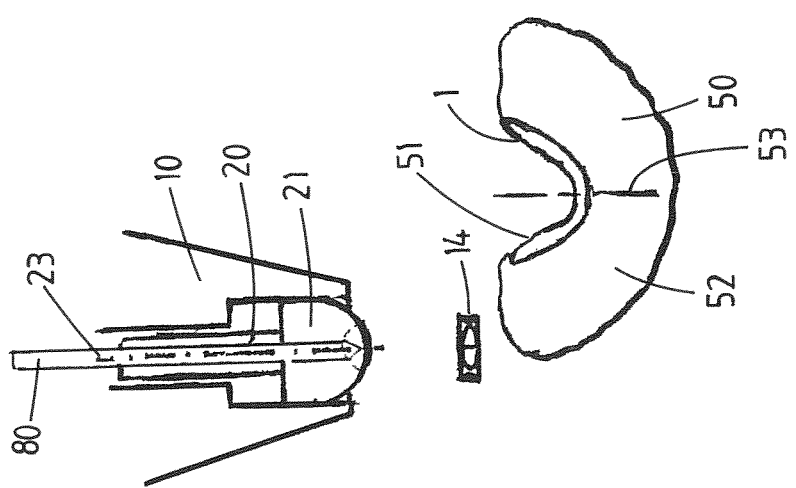
Figure 19C:
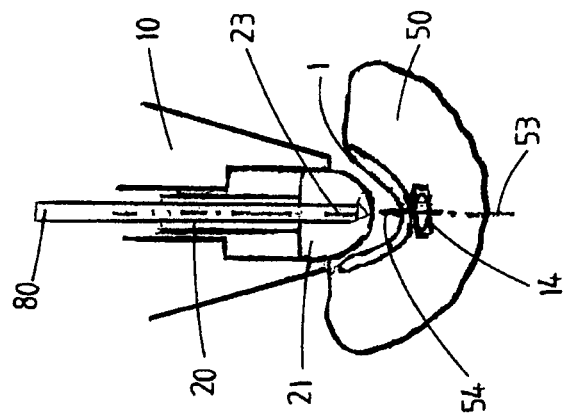
Figure 19D:
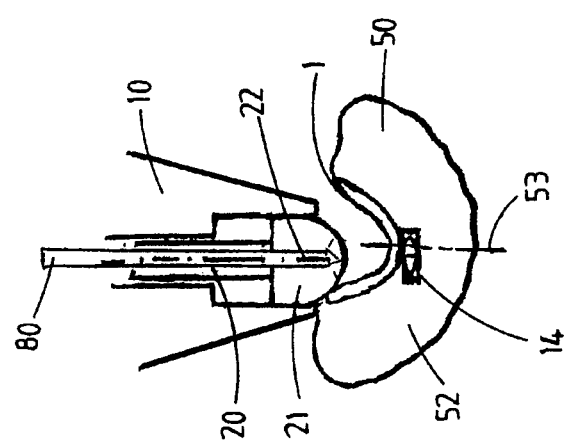
Figure 19F:
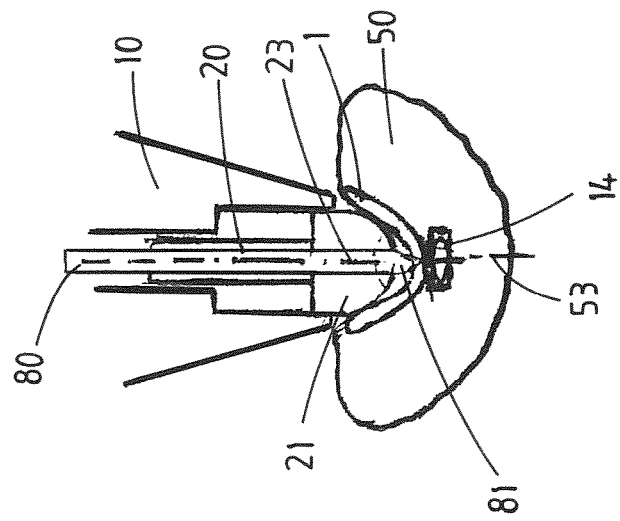
Figure 19E:
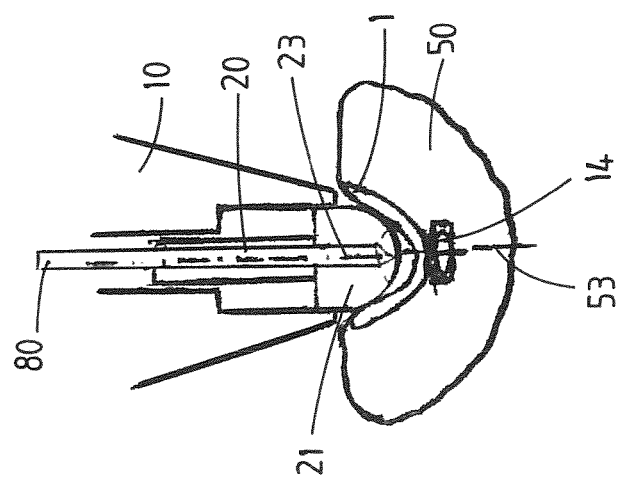

FIG. 19E shows the situation just after the positioning element 20 has positioned the carcass part 50 relative to the carrier 10. The carcass part has now reached the desired position.

This is the time to fixate the carcass part 50 in that desired position. This is done by moving the holding pin out of the positioning element 20, so that the sharp tip protrudes from the surface of the dome shaped engagement end 21 and grips the carcass part 50. Preferably, the sharp tip 81 of the holding element 80 penetrates into the carcass part 50; it could for example "bite" into the sternum 1. This is shown in FIG. 19F.

The carriers as shown in the embodiments of the FIGS. 4, 5, 6, 7, 9, 10, 11, 12, 13, 14, 15, 17 and 18 are of a type that is generally used in combination with a conveyor system that conveys the carriers along a track in the shape of an endless loop that extends in a substantially vertical plane.

Figure 20:
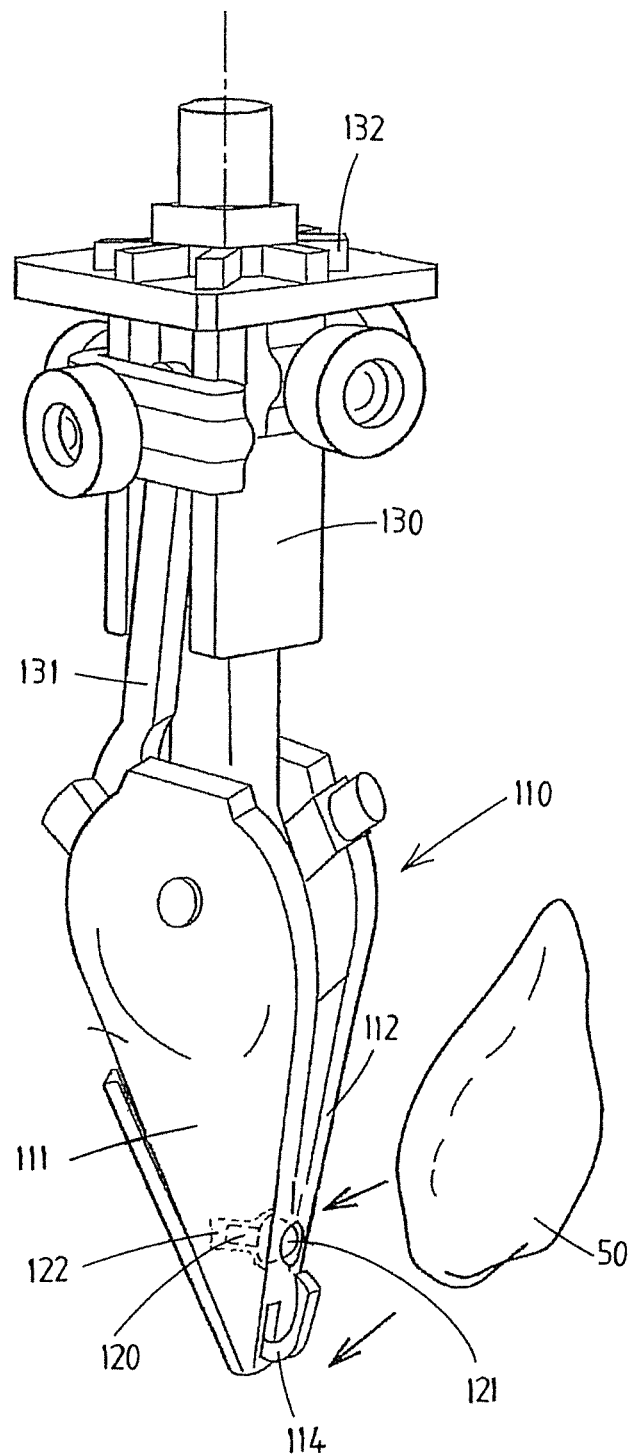
FIG. 20: a further alternative embodiment of a carrier according to the invention.
Figure 21:
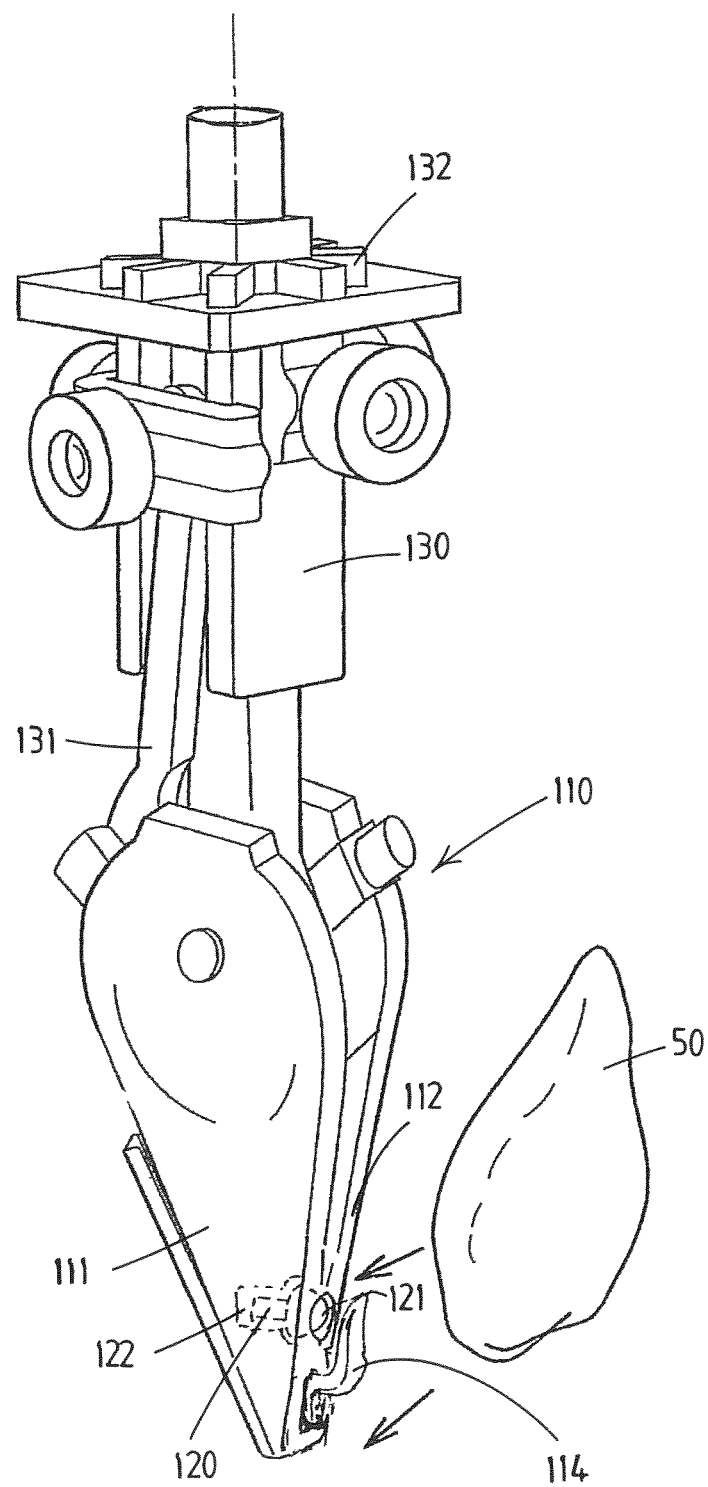
FIG. 21: a variant of the embodiment of FIG. 20, FIG. 22: a part of a system of processing slaughtered poultry using carriers according to the invention.

Alternatively, the invention could also be applied to other types of carriers, such as carriers that are connected to an overhead conveyor. Examples of such carriers can for example be found in EP1191852. FIG. 20 and FIG. 21 show examples of a carrier according to the invention that is suitable for connection to an overhead conveyor with trolleys. Such an overhead conveyor conveys trolleys—each of the trolleys carrying a carrier—along a track.

FIG. 20 shows a carrier 110 that is connected to a trolley 130. The trolley 130 can be connected to an overhead conveyor (not shown). The trolley 130 comprises several elements 131, 132 that allow to move the carrier relative to the track of the overhead conveyor. The combination of the elements 131, 132 makes that the carrier is moveable relative to the track of the overhead conveyor in a plurality of planes.

The carrier of FIG. 20 has a carrier body 111 with a support surface 112. It also has a hook 114. In the example of FIG. 20, the hook 114 is of the type that is commonly used in combination with carriers of this type. This hook 114 is rotatable between a set-up position and a clamping position. In the clamping position, the hook 114 engages the outer face of the carcass part.

FIG. 20 shows a breast cap 50 as the carcass part to be arranged onto the carrier 110. However, the carrier of FIG. 20 is also suitable for carrying other types of carcass parts, e.g. a front half.

The carrier 110 of FIG. 2—comprises a recess 122 into which a positioning element 120 is arranged. The positioning element 120 comprises a dome shaped engagement end 121. The positioning element 120 and the dome shaped engagement end 121 can be of any type that is disclosed in this application and function in the same way.

FIG. 21 shows a variant to the embodiment of FIG. 20. In the embodiment of FIG. 21, a hook 114 is present that is of the type as shown for example in FIG. 10. This hook 114 has a fixed position relative to the carrier body 111. Alternatively, a slit hook as for example shown in FIG. 4 could be used.

Figure 22:
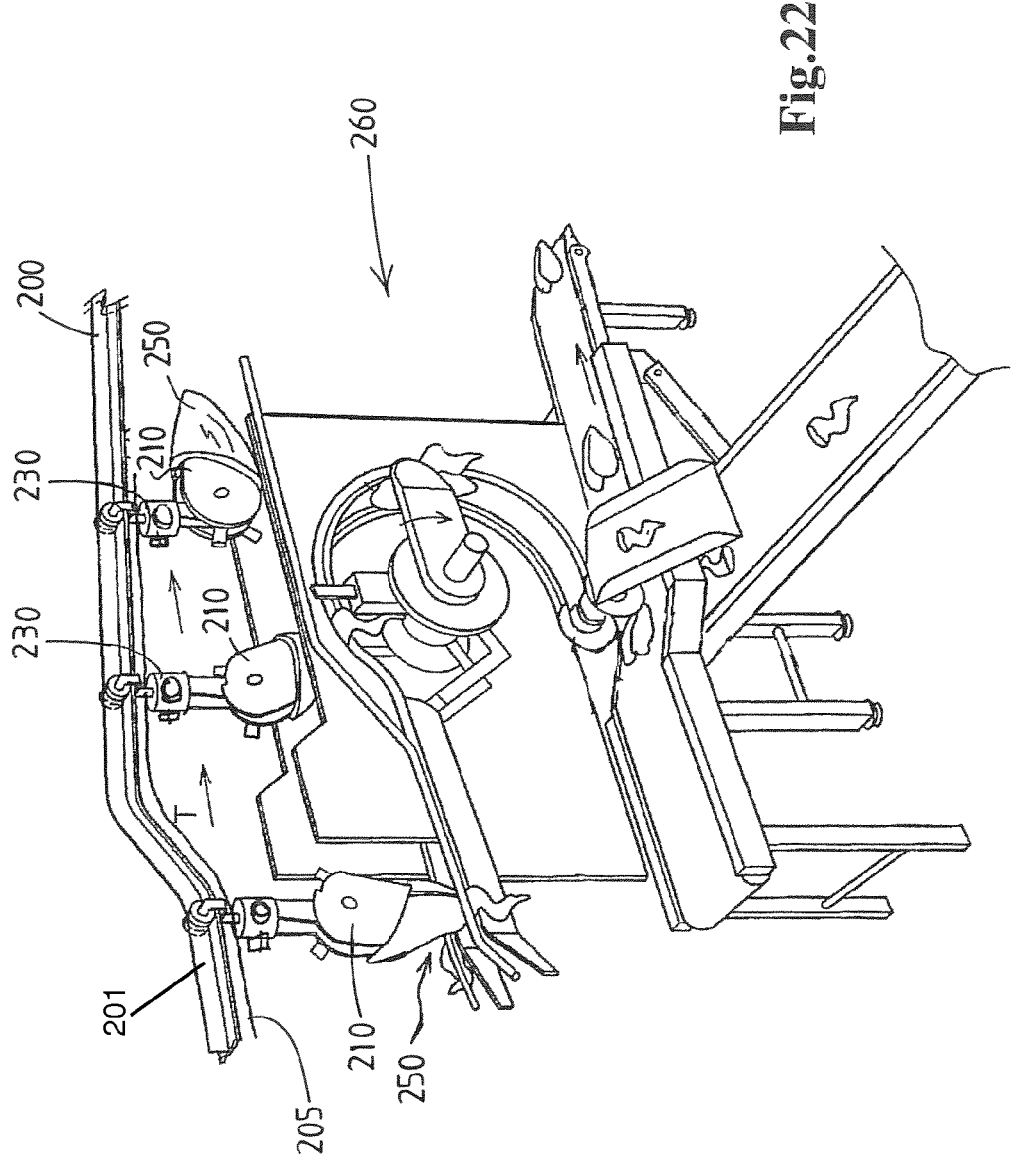

FIG. 22 shows an example of a system in accordance with the invention.

The system comprises a plurality of carriers 210. These carriers 210 are carriers in accordance with the invention, for example carriers according to one of the figures of this application.

The system further comprises a conveyor 200. In the example of FIG. 22, the conveyor 200 is an overhead conveyor. The conveyor comprises a number of trolleys 230. Each trolley 230 carries a carrier 210. In the example of FIG. 22, the carriers carry a front half, but alternatively an other type of carcass part could be carried.

The trolleys 230 are mutually connected by means of a chain or cable 205. This chain or cable 205 is connected to a driver.

The system further comprises a track 201. When the driver for the chain or cable 205 is active, the trolleys 230 are moved over the track 201 in direction of transport T. The track 201 usually forms a closed loop. In FIG. 22, only a part of the track 201 is shown.

Along the track a number of processing stations are arranged. Usually, a plurality of processing stations in present. The conveyor takes the carriers with any carcass parts 250 they carry along these processing stations. In a processing station, a process step is carried out on the carcass part 250.

In the example of FIG. 22, a processing station 260 for harvesting breast fillets is shown. Such a processing station is usually part of a processing line for processing breast caps or front halves. The carrier according to the invention is suitable for supporting a carcass part while that carcass part is processed by such a processing station 260.

Not shown in the figures is the embodiment in which a processing station is present in which the breast fillets are cut in half (a left part that was originally on the left side of the sternum crest and a right part that was originally on the right side of the sternum crest). The system could in a possible embodiment comprise such a processing station. The carrier according to the invention is suitable for supporting a carcass part while that carcass part is processed by such a processing station.

The invention claimed is:

1. Carrier for supporting a carcass part of slaughtered poultry, which carcass part comprises an inner face and an outer face, which carcass part further comprises at least a part of the corpus sterni of the sternum, the corpus sterni comprising at least a part of the facies visceralis sterni, and at least a part of the facies muscularis sterni, the inner face being on the same side of the sternum as the facies visceralis sterni and the outer face being on the same side of the sternum as the facies muscularis sterni, the carrier comprising:

a carrier body, said carrier body comprising a support surface for engaging at least a part of the inner face of the carcass part, a hook for holding the carcass part on the carrier body, a positioning element for positioning the carcass part relative to the carrier, which positioning element has a dome shaped engagement end for engaging the inner face of the carcass part, which positioning element is moveable between a retracted position and an extended position in which extended position the dome shaped engagement end of the positioning element protrudes from the support surface of the carrier body, the positioning element being arranged such relative to the support surface of the carrier body that in its extended position, the dome shaped engagement end of the positioning element engages the inner face of the carcass part at or adjacent to the facies visceralis sterni of the sternum in the region between the left and right margo costalis of the sternum.

2. Carrier according to claim 1, wherein the hook is moveable between a set-up position and a clamping position, the hook in the set-up position facilitating arrangement of a carcass part onto the carrier and in the clamping position clamping the carcass part against the carrier body.

3. Carrier according to claim 1, wherein the dome shaped engagement end of the positioning element is blunt so that it does not penetrate into the sternum.

4. Carrier according to claim 1, wherein the dome shaped engagement end of the positioning element is adapted to exert a force on the facies visceralis sterni of the sternum in the region between the left and right margo costalis of the sternum such that the carcass part is brought into a defined position relative to the carrier.

5. Carrier according to claim 1, wherein the dome shaped engagement end of the positioning element is spherical, annular, frustoconical or elliptical.

6. Carrier according to claim 1, wherein the width or diameter of the dome shaped engagement end of the positioning element is between about 10 mm and about 35 mm.

7. Carrier according to claim 1, wherein the carrier further comprises a holding element for fixing the position of the carcass part relative to the carrier.

8. Carrier according to claim 7, wherein the holding element is arranged in the positioning element, and the holding element has a retracted position and an extended position relative to the dome shaped engagement end of the positioning element.

9. Carrier according to claim 1, wherein the surface of the dome shaped engagement end of the positioning element is provided with a surface structure that comprises one or more recesses and/or protrusions.

10. Carrier according to claim 1, wherein the positioning element comprises two dome shaped engagement ends, each of the dome shaped engagement ends protruding from the support surface of the carrier body in the extended position of the positioning element or wherein the carrier comprises two positioning elements, each positioning element being provided with a dome shaped engagement end.

11. Carrier according to claim 1, wherein the positioning element is spring-loaded and/or spring mounted, or otherwise resiliently mounted relative to the carrier body.

12. Carrier according to claim wherein the positioning element is made of metal.

13. Carrier according to claim 1, wherein the hook is provided with a curved surface, which curved surface faces the carrier body.

14. Carrier according to claim 1, wherein the hook is provided with a cutting edge and/or wherein the hook is provided with a slit to accommodate a tendon that is connected to the sternum.

15. Carrier according to claim 1, wherein the carrier comprises a drive device configured to move the positioning element from the retracted position to the extended position and/or from the extended position to the retracted position.

16. System for processing a carcass part of slaughtered poultry, which carcass part comprises an inner face and an outer face, which carcass part further comprises at least a part of the corpus sterni of the sternum, the corpus sterni comprising at least a part of the facies visceralis sterni, and at least a part of the facies muscularis sterni, the inner face being on the same side of the sternum as the facies visceralis sterni and the outer face being on the same side of the sternum as the facies muscularis sterni, which system comprises:

a conveyor system, at least one carrier according to claim 1, which carrier is connected to the conveyor system, allowing the carrier to be moved along a track by the conveyor system, at least one processing station for processing said carcass part.

17. System according to claim 16, wherein the carrier is moveable relative to the conveyor.

18. System according to claim 16, wherein the processing station is a processing station for harvesting breast fillet or a processing station for cutting the breast fillet in half, the system optionally comprising a processing station for cutting the breast fillet in half and a processing station for harvesting breast fillet.

19. System according to claim 16, wherein the system comprises a drive device configured to move the positioning element from the retracted position to the extended position and/or from the extended position to the retracted position.

20. Method for arranging a carcass part of slaughtered poultry onto a carrier, which carcass part comprises an inner face and an outer face, which carcass part further comprises at least a part of the corpus sterni of the sternum, the corpus sterni comprising at least a part of the facies visceralis sterni, and at least a part of the facies muscularis sterni, the inner face being on the same side of the sternum as the facies visceralis sterni and the outer face being on the same side of the sternum as the facies muscularis sterni, which method comprises the following steps:

providing a carrier according to claim 1, arranging said carcass part onto the carrier, and bringing the hook into engagement with the carcass part in such a way that the hook still allows some movement of the carcass part relative to the carrier, bringing the dome shaped engagement end of the positioning element into engagement with the inner face of the carcass part, moving the positioning element towards its extended position such that the dome shaped engagement end of the positioning element comes to lie against the inner face of the carcass part at or adjacent to the facies visceralis sterni of the sternum in the region between the left and right margo costalis of the sternum, the positioning element thereby exerting a force on the carcass part and with this force positioning and/or orienting the carcass part relative to the carrier.

21. Method according to claim 20, wherein the positioning element is in its retracted position when arranging the carcass part on the support surface of the carrier body.

22. Method according to claim 20, wherein the hook is pushed at least partly into meat that is present on the carcass part.

23. Method according to claim 20,
wherein the hook is moveable between a set-up position and a clamping position, the hook in the set-up position facilitating arrangement of a carcass part onto the carrier and in the clamping position clamping the carcass part against the carrier body, and
wherein the hook is in its set-up position when arranging the carcass part on the support surface of the carrier body, and the hook is moved into its clamping position after bringing the positioning element into engagement with the inner face of the carcass part, during or after moving the positioning element towards its extended position such that the positioning element comes to lie against the inner face of the carcass part at or adjacent to the facies visceralis sterni of the sternum in the region between the left and right margo costalis of the sternum, therewith positioning and/or orienting the carcass part relative to the carrier.

24. Method according to claim 20, wherein the dome shaped engagement end of the positioning element does not penetrate into the sternum.

25. Method according to claim 20, wherein the carcass part is a front half or a breast piece.

* * * * *